US010556591B2

(12) United States Patent
Suzuki et al.

(10) Patent No.: US 10,556,591 B2
(45) Date of Patent: Feb. 11, 2020

(54) VEHICLE CONTROL DEVICE

(71) Applicant: HITACHI AUTOMOTIVE SYSTEMS, LTD., Hitachinaka-shi, Ibaraki (JP)

(72) Inventors: Kohei Suzuki, Ibaraki (JP); Toshio Hori, Ibaraki (JP); Yoshiaki Nagasawa, Ibaraki (JP); Naoyuki Tashiro, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/076,366

(22) PCT Filed: Jan. 13, 2017

(86) PCT No.: PCT/JP2017/000913
§ 371 (c)(1),
(2) Date: Aug. 8, 2018

(87) PCT Pub. No.: WO2017/149948
PCT Pub. Date: Sep. 8, 2017

(65) Prior Publication Data
US 2019/0039586 A1 Feb. 7, 2019

(30) Foreign Application Priority Data

Feb. 29, 2016 (JP) ................... 2016-036558

(51) Int. Cl.
*B60W 30/18* (2012.01)
*B60T 7/12* (2006.01)
(Continued)

(52) U.S. Cl.
CPC ....... *B60W 30/18072* (2013.01); *B60T 7/042* (2013.01); *B60T 7/085* (2013.01);
(Continued)

(58) Field of Classification Search
CPC ...... B60W 10/02; B60W 10/06; B60W 10/10; B60W 30/18072; B60W 2030/1809; B60W 2720/106
See application file for complete search history.

(56) References Cited

U.S. PATENT DOCUMENTS 6,719,076 B1 * 4/2004 Tabata .................. B60K 31/00
180/65.7
6,805,211 B2 * 10/2004 Fujikawa ............... B60K 6/383
180/65.25
(Continued)

FOREIGN PATENT DOCUMENTS

EP 0 810 115 A2 12/1997
JP H09-317864 A 12/1997
(Continued)

OTHER PUBLICATIONS

Office Action dated Jun. 25, 2019 in corresponding Japanese Patent Application No. 2018-502556 with translation.
(Continued)

*Primary Examiner* — Erin D Bishop
(74) *Attorney, Agent, or Firm* — Foley & Lardner LLP

(57) ABSTRACT

While a vehicle is coasting with an engine being automatically stopped and a power transmission path between the engine and wheels being disengaged, when a deceleration request is made and the engine is restarted with the power transmission path being engaged, a deceleration level increases relative to the deceleration level required by a driver or the vehicle, thereby lowering drivability. A vehicle control apparatus includes a deceleration level control unit that controls the deceleration level of the vehicle such that, during travelling of the vehicle continuing to travel with a power transmission mechanism between the engine and the wheels being disengaged, when the deceleration request is made and the engine is started by an engagement of the
(Continued)

power transmission mechanism, the deceleration level becomes a target deceleration level calculated from a first target deceleration level generated after the engagement of the power transmission mechanism is complete and a second target deceleration level generated in response to the deceleration request.

9 Claims, 19 Drawing Sheets

(51) Int. Cl.
*B60W 10/06* (2006.01)
*B60W 10/10* (2012.01)
*F16H 59/48* (2006.01)
*F16H 61/02* (2006.01)
*H02P 9/04* (2006.01)
*B60T 7/04* (2006.01)
*B60T 7/08* (2006.01)
*B60T 13/66* (2006.01)
*B60T 8/172* (2006.01)
*B60W 10/184* (2012.01)
*F02D 17/00* (2006.01)
*F02D 29/02* (2006.01)

(52) U.S. Cl.
CPC .............. *B60T 7/12* (2013.01); *B60T 13/662* (2013.01); *B60W 10/06* (2013.01); *B60W 10/10* (2013.01); *F16H 59/48* (2013.01); *F16H 61/02* (2013.01); *H02P 9/04* (2013.01); *B60T 8/172* (2013.01); *B60W 10/184* (2013.01); *B60W 2030/1809* (2013.01); *B60W 2720/106* (2013.01); *F02D 17/00* (2013.01); *F02D 29/02* (2013.01)

(56) References Cited

U.S. PATENT DOCUMENTS 9,932,027 B2 * 4/2018 Liggins .................... B60K 6/20
2015/0291171 A1 10/2015 Kuroki et al.

FOREIGN PATENT DOCUMENTS

| JP | 2002-046507 A | 2/2002 |
| JP | 2005-313831 A | 11/2005 |
| JP | 2006-200370 A | 8/2006 |
| JP | 5531915 B2 | 5/2012 |
| JP | 2013-014282 A | 1/2013 |
| WO | WO-2013/046381 A1 | 4/2013 |
| WO | WO-2014/068719 A1 | 5/2014 |

OTHER PUBLICATIONS

International Search Report with English translation and Written Opinion issued in corresponding application No. PCT/JP2017/000913 dated May 9, 2017.

Office Action dated Mar. 5, 2019 in the corresponding Japanese Patent Application No. 2018-502556 with its English machine translation.

* cited by examiner

VEHICLE CONTROL DEVICE

TECHNICAL FIELD

The present invention relates to a vehicle control apparatus, and more particularly, to a vehicle control apparatus that controls a deceleration level of a vehicle when, during an automatic stop of an engine, the engine is restarted by an engagement of a power transmission mechanism between the engine and wheels.

BACKGROUND ART

In recent years, in order to improve fuel economy, an automatic engine stop/start system, which automatically stops an engine when a vehicle is stopped and restarts the engine using a starter at a time of starting the vehicle, has been widespread. Further, in JP 2006-200370 A (Patent Literature 1), there is proposed a technique in which the engine is automatically stopped when a predetermined condition for an engine automatic stop (for example, a state where an accelerator is not depressed for a predetermined time or more) is satisfied during traveling of the vehicle, and the power transmission path between the engine and the wheels is disengaged so that the vehicle coasts while minimizing reduction in speed, thereby further reducing fuel consumption.

Furthermore, in JP 5531915 B2 (Patent Literature 2), there is proposed a technique in which a starting clutch stands by in a state of half engagement when generation of the latest engine restart request is predicted on the basis of an operation amount of a brake pedal, vehicle speed, and the like during an eco-run operation in which fuel supply is stopped and the vehicle is caused to run by coasting, thereby improving acceleration responsiveness.

CITATION LIST

Patent Literature

PTL 1: JP 2006-200370 A
PTL 2: JP 5531915 B2

SUMMARY OF INVENTION

Technical Problem

In the state of coasting described above, when restart (cranking) is started by the starter, the starter is activated and the cranking is started at the time point where engine speed reaches the level at which the starter and the engine can be engaged with each other. However, as the number of restarts increases and the number of starter activations increases, durability of the starter decreases. In view of the above, when the wheels have sufficient driving force, the power transmission path between the engine being stopped and the driving wheels is engaged so that kinetic energy of the vehicle is transmitted to the engine to start, thereby enabling the restart (cranking) of the engine without activating the starter. However, since the power transmission path is engaged with the engine being stopped, an actual deceleration level increases relative to the deceleration level required by a driver or the vehicle. Accordingly, there may be a problem that drivability is lowered.

The present invention has been accomplished in consideration of the problems described above, and it is an object of the present invention to provide a vehicle control apparatus capable of preventing lowering of drivability during coasting where an engine is automatically stopped and a power transmission path between the engine and wheels is disengaged.

Solution to Problem

In order to solve the problems described above, a vehicle control apparatus according to the present invention includes a deceleration level control unit that controls a deceleration level of a vehicle such that, during travelling of the vehicle continuing to travel with a power transmission mechanism between an engine and wheels being disengaged, when a deceleration request is made and the engine is started by an engagement of the power transmission mechanism, the deceleration level becomes a target deceleration level calculated from a first target deceleration level generated after the engagement of the power transmission mechanism is complete and a second target deceleration level generated in response to the deceleration request.

Advantageous Effects of Invention

As described above, according to the present invention, it becomes possible to provide a vehicle control apparatus capable of preventing lowering of the drivability during coasting where the engine is automatically stopped and the power transmission path between the engine and the wheels is disengaged.

Other configurations, actions, and effects of the present invention will be described in detail in the following embodiments.

DESCRIPTION OF EMBODIMENTS

Figure 1:
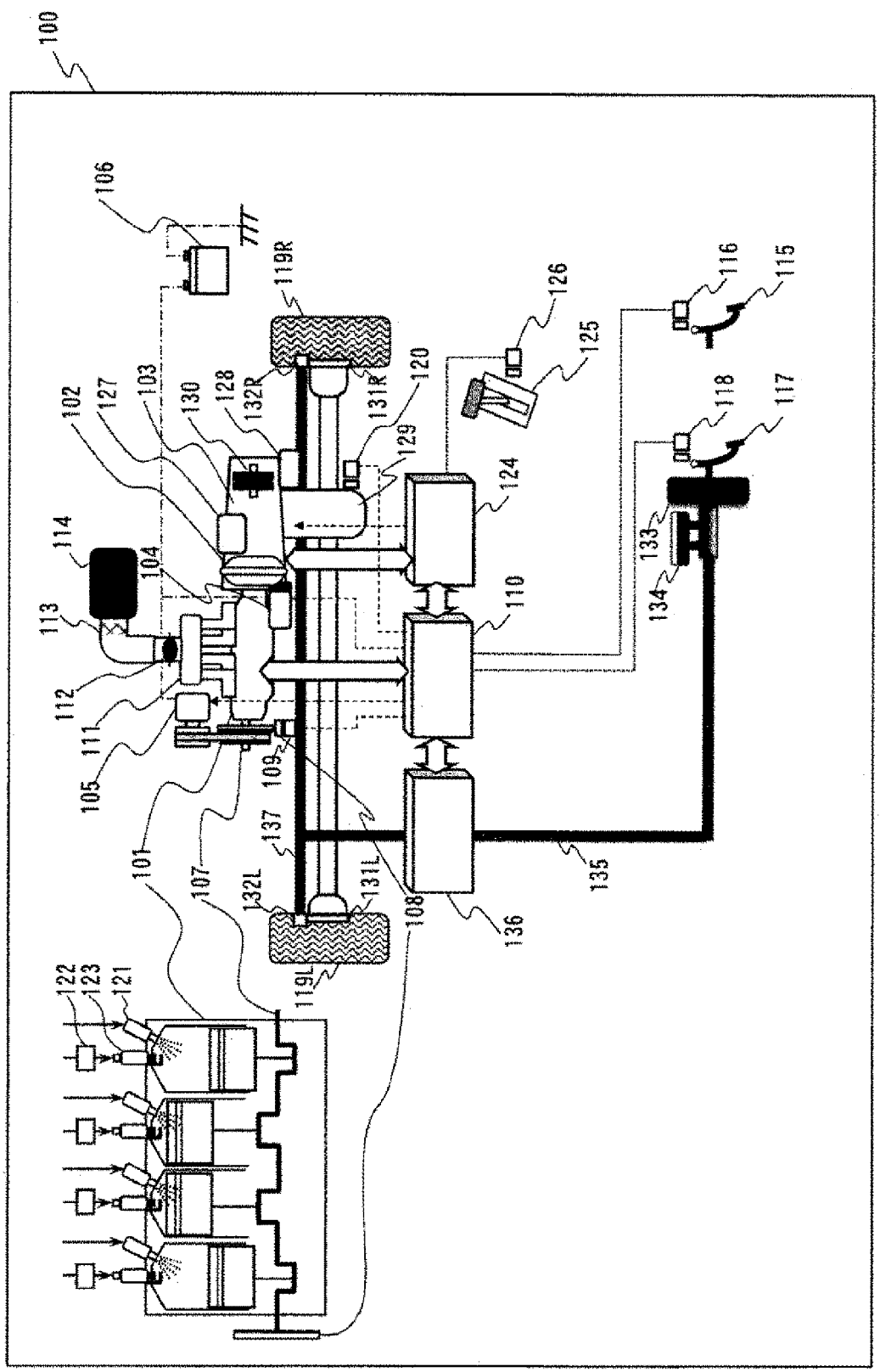
FIG. 1 is an example of an overall configuration of a vehicle that includes a vehicle control apparatus according to the present invention.

Hereinafter, embodiments of the present invention will be described in detail with reference to the drawings.
First Embodiment A first embodiment of the present invention will be described with reference to FIGS. 1 to 13. FIG. 1 is an example of an overall configuration of a vehicle that includes a vehicle control apparatus according to the present invention.

In FIG. 1, a vehicle 100 includes an engine body 101 (which is also simply referred to as an internal combustion engine or an engine) as a driving force source, and a torque converter 102 provided on an output side of the engine 101. A transmission 103 is coupled to an output side of the torque converter 102. A type of the engine 101 may be any driving force source that causes the vehicle 100 to travel, and examples thereof include a port-injection type or in-cylinder-injection type gasoline engine, and a diesel engine. With regard to a structure of the engine 101, it may be a reciprocating engine or a Wankel-type rotary engine.

Further, the engine 101 includes a starter 104 and a generator 105 that supplies electric power to the vehicle 100. The starter 104 may be, for example, a starter motor that includes a DC motor, a gear mechanism, and a gear pushing mechanism. The starter 104 is driven by the electric power supplied from a power source 106, and starts the engine 101 on the basis of a start request. With respect to the power source 106, for example, a lead battery can be suitably used, and various types of secondary batteries such as a lithium-ion secondary battery, or storage batteries such as a capacitor, may be used. Further, the generator 105 may be, for example, an alternator that includes an induction generator, a rectifier, and a voltage adjustment mechanism. The power source 106 stores the electric power generated by the generator 105 and supplies the electric power to vehicular electric components such as the starter 104, a head lamp (not illustrated), and various controllers.

The engine 101 also includes a crankshaft 107. The crankshaft 107 is provided with, on one side thereof, a signal plate 108 having a predetermined pattern formed thereon for detecting a crank angle signal, whereas, on the other side of the crankshaft 107, a ring gear that is integral with a drive plate (not illustrated) for transmitting driving force to the transmission is provided. A crank angle sensor 109 that detects irregularities of the pattern of the signal plate 108 and outputs a pulse signal is attached in the vicinity of the signal plate 108. On the basis of the pulse signal output from the crank angle sensor 109, an engine control unit (hereinafter referred to as ECU) 110 calculates a rotation speed (engine speed) of the engine 101.

Further, as intake system components of the engine 101, there are attached an intake manifold 111 that distributes intake air to each cylinder, a throttle valve 112, an air flow sensor 113, and an air cleaner 114. The throttle valve 112 is an electronically controlled throttle device that controls an optimum throttle valve opening degree by calculating and outputting the optimum throttle opening degree using the ECU 110. The optimum throttle opening degree is calculated on the basis of a signal from an accelerator pedal sensor 116 that detects a depression amount of an accelerator pedal 115, a signal from a brake pedal sensor 118 that detects a depression amount of a brake pedal 117, a signal from a vehicle speed sensor 120 that detects vehicle speed from a rotation speed of wheels 119L and 119R, and other signals sent from each of other sensors. The air flow sensor 113 measures an air flow rate sucked from the air cleaner 114 and outputs the air flow rate to the ECU 110. The ECU 110 calculates a fuel amount that corresponds to the measured air amount and outputs the fuel amount to a fuel injection valve 121 as a valve opening time. With regard to a valve opening timing, a fuel injection is started at a predetermined timing preset by the ECU 110 on the basis of the signal from the crank angle sensor 109. As a result of this operation, the sucked air and the fuel injected from the fuel injection valve 121 are mixed inside a cylinder of the engine 101, thereby forming an air-fuel mixture. An ignition timing of the air-fuel mixture is also preset by the ECU 110 on the basis of the signal from the crank angle sensor 109. The air-fuel mixture inside the cylinder is ignited by an ignition plug 123 energized via an ignition coil 122, thereby causing combustion explosion.

Moreover, the engine 101 transmits the kinetic energy acquired by the above-described combustion explosion to the crankshaft 107 to generate a rotational driving force. The drive plate (not illustrated) is attached to the transmission side of the crankshaft 107 and is directly connected to the input side of the torque converter 102. On the other hand, the output side of the torque converter 102 is input to the transmission 103. The transmission 103 is a transmission body having a step-variable transmission mechanism or a belt/disc-type continuously variable transmission mechanism, which is controlled by a transmission control unit (hereinafter referred to as TCU) 124 to determine a proper transmission gear or a transmission gear ratio on the basis of engine information (engine speed, vehicle speed, and throttle opening degree) and gear range information 126 of a gear shift lever 125, thereby controlling an optimum transmission gear ratio. Control of the transmission gear ratio is performed by controlling hydraulic pressure of the transmission using a mechanical oil pump 127 while the engine 101 is being started, and using an electric oil pump 128 while the engine 101 is stopped. Further, a clutch mechanism 130 is provided between the transmission mechanism and a differential mechanism 129. The clutch mechanism 130 is engaged when the driving force from the transmission mechanism is transmitted to the differential mechanism 129 to drive the wheels 119, whereas the clutch mechanism 130 is disengaged when reverse driving force from the wheels 119 is cut off so that the reverse driving force is not transmitted to the transmission mechanism.

Furthermore, the wheels 119L and 119R are provided with brake disk rotors 131L and 131R, and brake pads 132L and 132R, by which braking force of the wheels 119L and 119R is secured. When the brake pedal 117 is depressed, depression force is transmitted to a master cylinder 134 by a brake booster 133. Along with this, brake fluid (brake oil) filling the brake pipe 135 is pushed out by the master cylinder 134 and the hydraulic pressure in a brake pipe 135 is changed, which is detected by a hydraulic unit (hereinafter referred to as HU) 136. The HU 136 can brake the wheels 119L and 119R by controlling the brake pads 132L and 132R by operating the hydraulic pressure in a brake pipe 137 filled with the brake fluid (brake oil) on the basis of the detected hydraulic pressure. As a brake device for the wheels 119L and 119R, a drum brake may be used. Moreover, the brake pads 132L and 132R may be, instead of the hydraulic ones that can be operated corresponding to the depression amount of the brake pedal 117, the ones provided with an electric actuator mechanism that can be operated by a command value from the HU 136.

When the vehicle 100 is traveling, the clutch 130 is disengaged to cut off the reverse driving force, and the engine 101 is stopped, whereby a state where running resistance is minimized can be produced. This can improve fuel economy.

Figure 2:
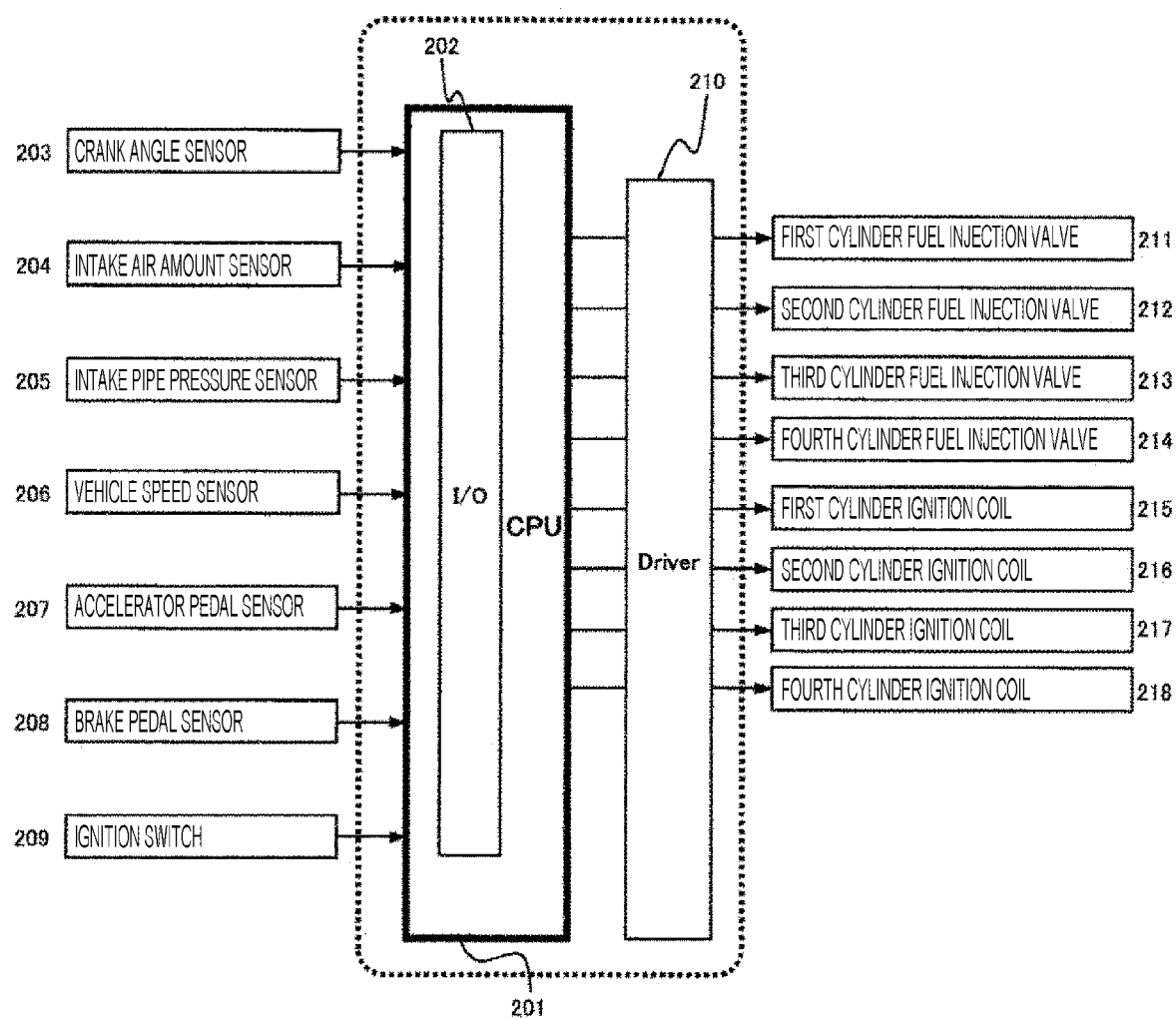
FIG. 2 is an example of an internal configuration of the vehicle control apparatus according to the present invention.

FIG. 2 is an example of an internal configuration of the vehicle control apparatus according to the present embodiment. Note that, in the present embodiment, the ECU 110 is treated as a part of the vehicle control apparatus. Therefore, in the present embodiment, the on-board control apparatus is a combination of the ECU 110, the TCU 120, and the HU 136. In the ECU 20, an input/output (I/O) unit 202 is set inside a central processing unit (CPU) 201. The I/O unit 202 converts electric signals from each sensor disposed in the engine into signals for digital calculation processing, and also converts control signals for digital calculation into drive signals of an actual actuator. A crank angle sensor 203, an intake air amount sensor 204, an intake pipe pressure sensor 205, a vehicle speed sensor 206, an accelerator pedal sensor 207, a brake pedal sensor 208, and an ignition switch 209 are input into the I/O unit 202. Output signals from the CPU 201 are transmitted to fuel injection valves 211 to 214 and ignition coils 215 to 218 via a driver 210.

Hereinafter, a problem to be solved by the vehicle control apparatus according to the present embodiment will be described with reference to FIG. 3. Note that FIG. 3 is an example of behavior of a vehicle deceleration level in a case where a deceleration request is made and the engine 101 is started by an engagement of the clutch 130 with respect to the vehicle control apparatus according to the present embodiment.

Figure 3:
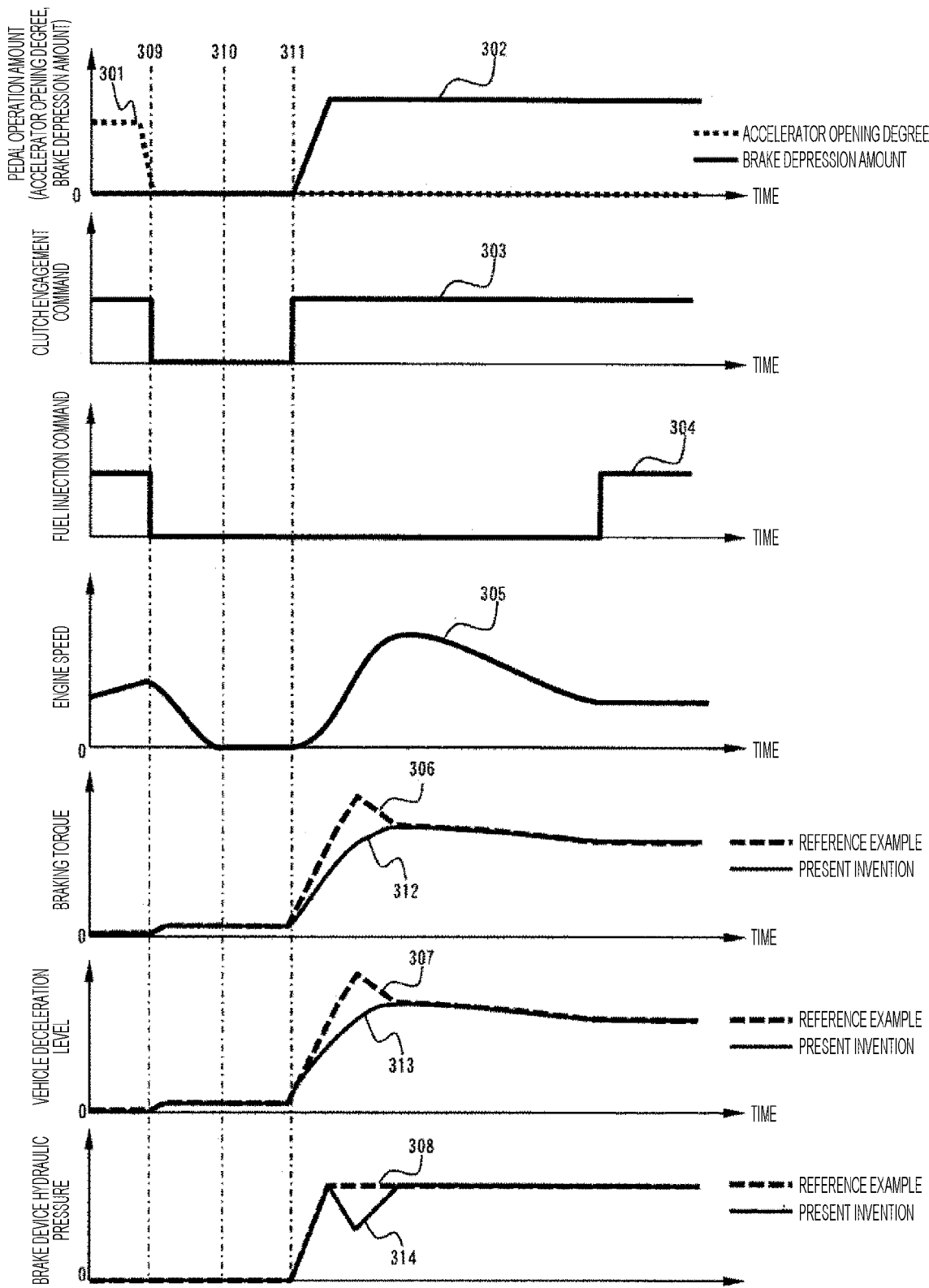
FIG. 3 is an example of behavior of a vehicle deceleration level in a case where a deceleration request is made and an engine 101 is started by an engagement of a clutch 130 with respect to the vehicle control apparatus according to the present invention.

In FIG. 3, a horizontal axis represents time and vertical axes represent accelerator opening degree 301, a brake depression amount 302, a clutch engagement command 303, a fuel injection command 304, engine speed 305, a braking torque 306, a vehicle deceleration level 307, and a brake device hydraulic pressure 308. At a time point 309 during traveling of the vehicle, an engine automatic stop condition is satisfied on the basis of an accelerator off state where the accelerator opening degree 301 is zero. At this time, the clutch 130 is disengaged by the clutch engagement command 303 turned off, and the fuel injection is stopped by the fuel injection command 304 turned off. Accordingly, the engine 101 enters a state where the rotation cannot be maintained autonomously, whereby the engine speed 305 becomes zero at a time point 310 and the engine is stopped.

At this time, the vehicle 100 coasts and the vehicle deceleration level 307 is generated only by the running resistance. Then, at a time point 311 during coasting, when the operation of the driver causes the brake depression amount 302 to exceed zero, that is, when the driver depresses the brake pedal 117, there may be a case where the driver intends to express, in addition to the deceleration request, a request for stopping coasting, that is, a request for shifting into a state where the engine 101 is restarted and the clutch 130 is engaged. At this time, the engine 101 is cranked by activation of the starter 104, and the fuel injection is restarted by the fuel injection command 304 turned on, whereby the engine 101 can be restarted.

Meanwhile, since the clutch 130 is disengaged at the time point 309 and thereafter, at the time point 311, the clutch 130 is engaged by the clutch engagement command 303 turned on without activating the starter 104, and the kinetic energy of the coasting vehicle 100 is transmitted to the engine 101, whereby the engine 101 can be restarted. At this time, the braking torque 306 is generated by a braking torque generated after the engagement of the clutch 130 is complete and another braking torque generated in response to the deceleration request generated by the depressing operation of the brake pedal 117.

However, in this case, the engagement is performed in a state where the engine speed 305 is zero, that is, in a state where a deviation occurs between the engine speed and the vehicle speed (rotation speed of wheels), whereby the braking torque 306 rapidly increases at a time immediately after the time point 311. As a result, the vehicle deceleration level 307 also rapidly increases so that what is called an engagement shock is increased, thereby lowering drivability. In view of the above, it is an object of the present embodiment to provide a vehicle control apparatus capable of controlling a deceleration level of the vehicle 100 on the basis of vehicle speed when the engine 101 is started by an engagement of the clutch 130.

Hereinafter, the vehicle control apparatus according to the present embodiment will be described with reference to FIGS. 4 to 13. Note that FIG. 4 is a block diagram that exemplifies a control configuration of a central processing unit (CPU) 201 included in the vehicle control apparatus (ECU 110) illustrated in FIG. 1.

Figure 4:
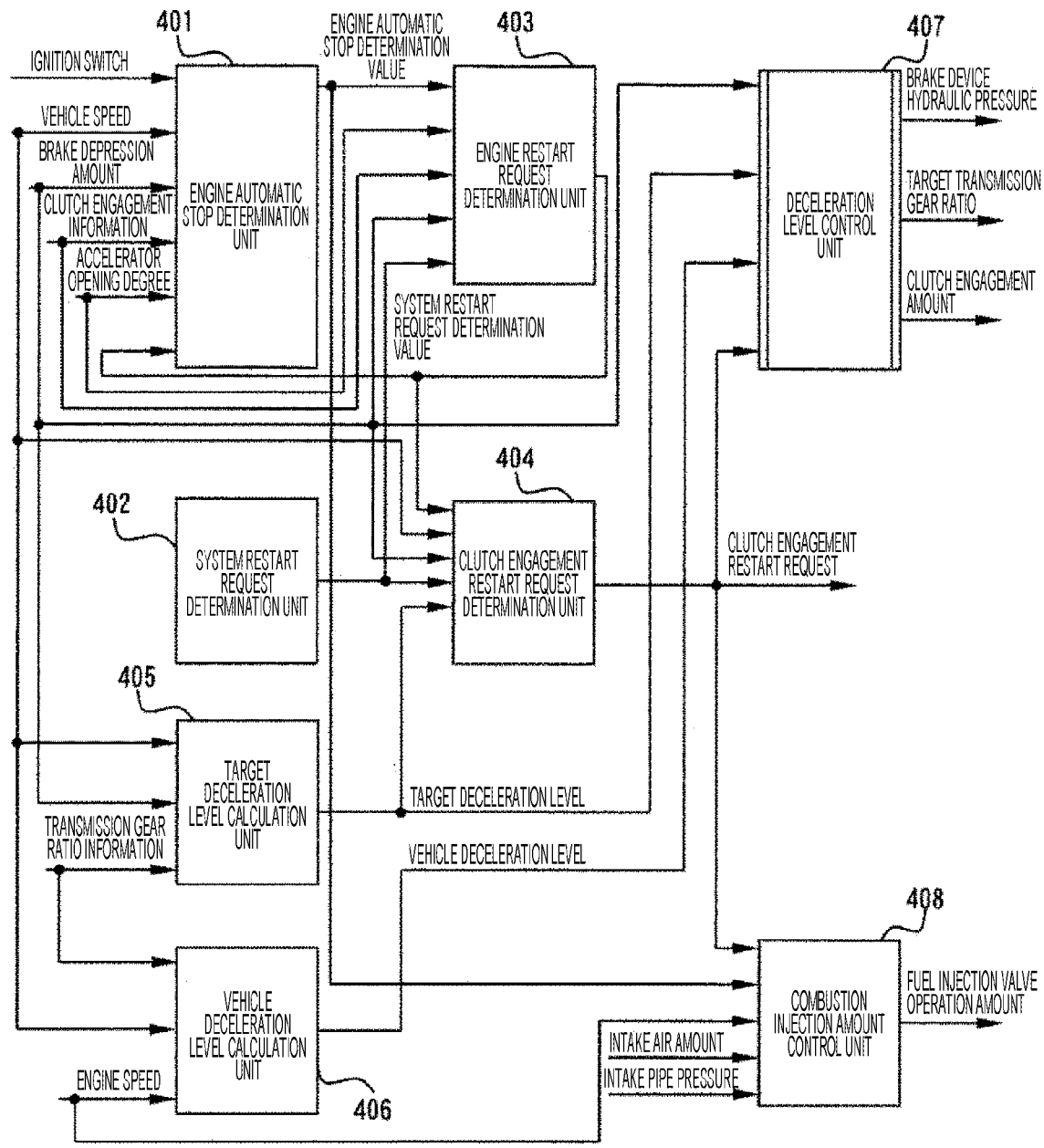
FIG. 4 is an exemplary control block configuration of an ECU 110 of the vehicle control apparatus according to the present invention.

In FIG. 4, an engine automatic stop determination unit 401 included in the CPU201 of the ECU 110 determines an automatic engine stop on the basis of an ignition switch, vehicle speed, a brake depression amount, clutch engagement information acquired from an output of the TCU 124, accelerator opening degree, and engine restart request determination information determined in a block 403 to be described later. Here, the clutch engagement information indicates information on engagement/disengagement of the clutch 130 that is controlled by the TCU 124 on the basis of a clutch engagement amount calculated by a deceleration level control unit 407 to be described later. When an automatic stop is determined by the engine automatic stop determination unit 401, as indicated at the time point 309 in FIG. 3, control is performed such that the engagement of the clutch 130 is cut off and also the fuel injection of the fuel injection valve 121 is stopped, whereby the engine speed becomes zero and the automatic stop is performed.

Figure 6:
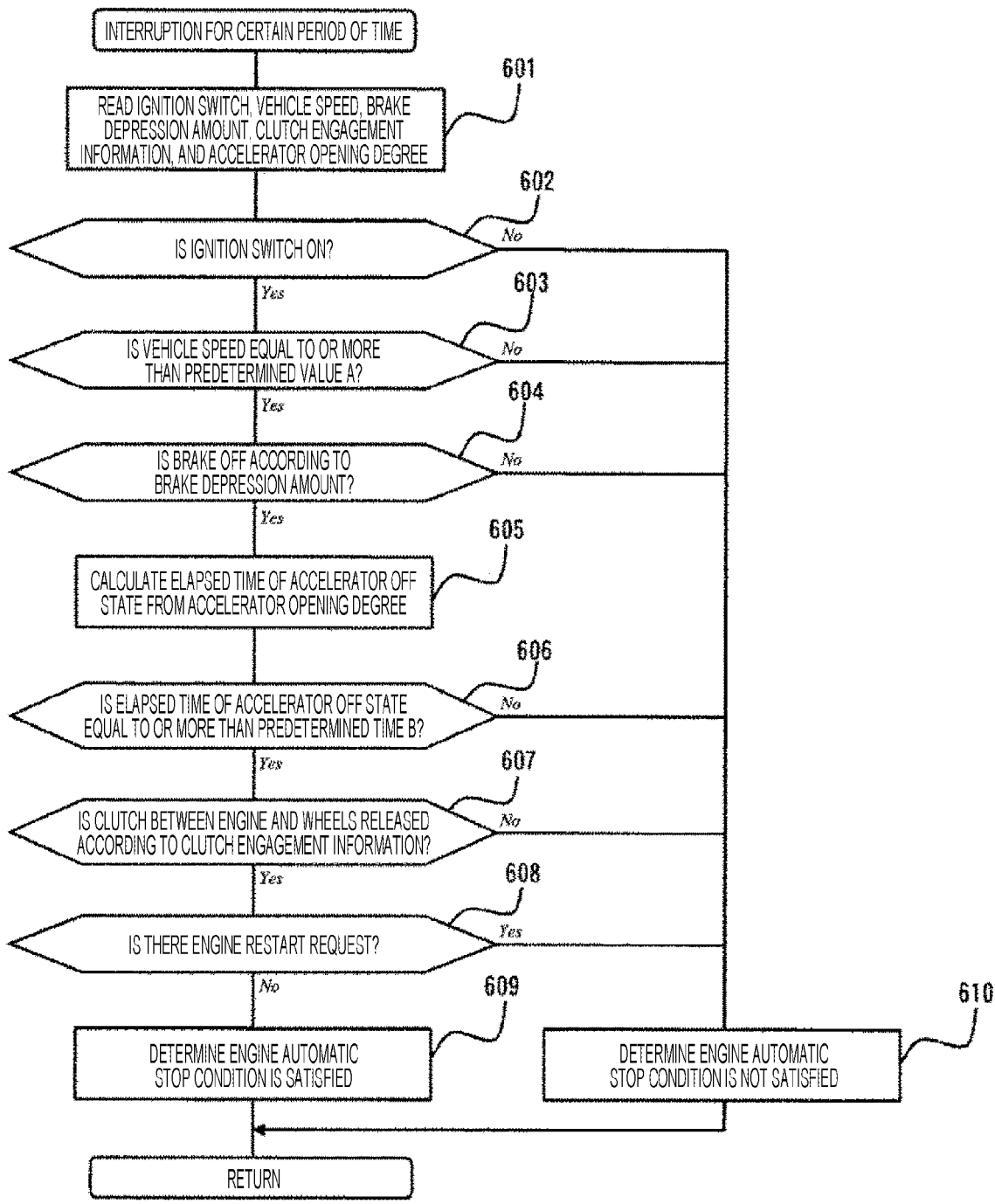
FIG. 6 is an exemplary flowchart of a block 401 of the vehicle control apparatus according to the present invention.

FIG. 6 is an exemplary flowchart of the engine automatic stop determination unit 401 included in the CPU 201 of the ECU 110 illustrated in FIG. 4. In Step 601, the ignition switch, the vehicle speed, the brake depression amount, the clutch engagement information, and the accelerator opening degree are read. In Step 602, it is determined whether the ignition switch is on. When the determination is established, the process proceeds to Step 603 to be described later. Otherwise, the process proceeds to Step 610 to be described later. In Step 603, it is determined whether the vehicle speed is equal to or more than a predetermined value A. When the determination is established, the process proceeds to Step 604 to be described later. Otherwise, the process proceeds to Step 610 to be described later. Here, the predetermined value A is set to, for example, a value with which to determine performance of the coasting of the vehicle 100 where the engine 101 is automatically stopped and the clutch 130 is disengaged.

In Step 604, it is determined from the brake depression amount whether the brake is off. When the determination is established, the process proceeds to Step 605 to be described later. Otherwise, the process proceeds to Step 610 to be described later. In Step 605, an elapsed time of an accelerator off state is calculated from the accelerator opening degree. The elapsed time is reset to zero when the accelerator is on. In Step 606, it is determined whether the elapsed time of the accelerator off state is equal to or more than a predetermined time B. When the determination is established, the process proceeds to Step 607 to be described later. Otherwise, the process proceeds to Step 610 to be described later. Here, the predetermined time B is set to, for example, a value with which the accelerator off state established by the driver is determined not to be in a process of shifting to a brake on state.

In Step 607, it is determined from the clutch engagement information whether the clutch 130 between the engine 101 and the wheels 119L and 119R is disengaged. When the determination is established, the process proceeds to Step 608 to be described later. Otherwise, the process proceeds to Step 610 to be described later. In Step 608, it is determined whether there is the engine restart request. When the determination is established, the process proceeds to Step 610 to be described later. Otherwise, the process proceeds to Step 609 to be described later. In Step 609, it is determined that the engine automatic stop condition is satisfied. In Step 610, it is determined that the engine automatic stop condition is not satisfied.

A system restart request determination unit 402 determines, during the engine automatic stop, whether the engine needs to be started by the engagement of the clutch 130 irrespective of the driver's operation of the brake pedal under at least one of the following situations where (1) performance degradation or abnormality detection occurs with respect to a system component or a function of the vehicle, (2) a request for an air conditioning operation occurs, (3) a request for power generation occurs, and (4) a request for increasing the deceleration level of the vehicle occurs in order to avoid a collision with a forward object of the vehicle on the basis of outside recognition information.

That is, although FIG. 3 illustrates the case where the engine is restarted under a condition where the driver operates the brake pedal after the engine is automatically stopped, the present embodiment is not limited to such a case. In addition to the case above, when the above-described situations (1) to (4) occur during the engine automatic stop, the system restart request determination unit 402 detects such situations, and control is performed such that the clutch 130 is engaged by a clutch engagement restart request determination unit 404 and also the engine is restarted by an engine restart request determination unit 403.

Figure 7:
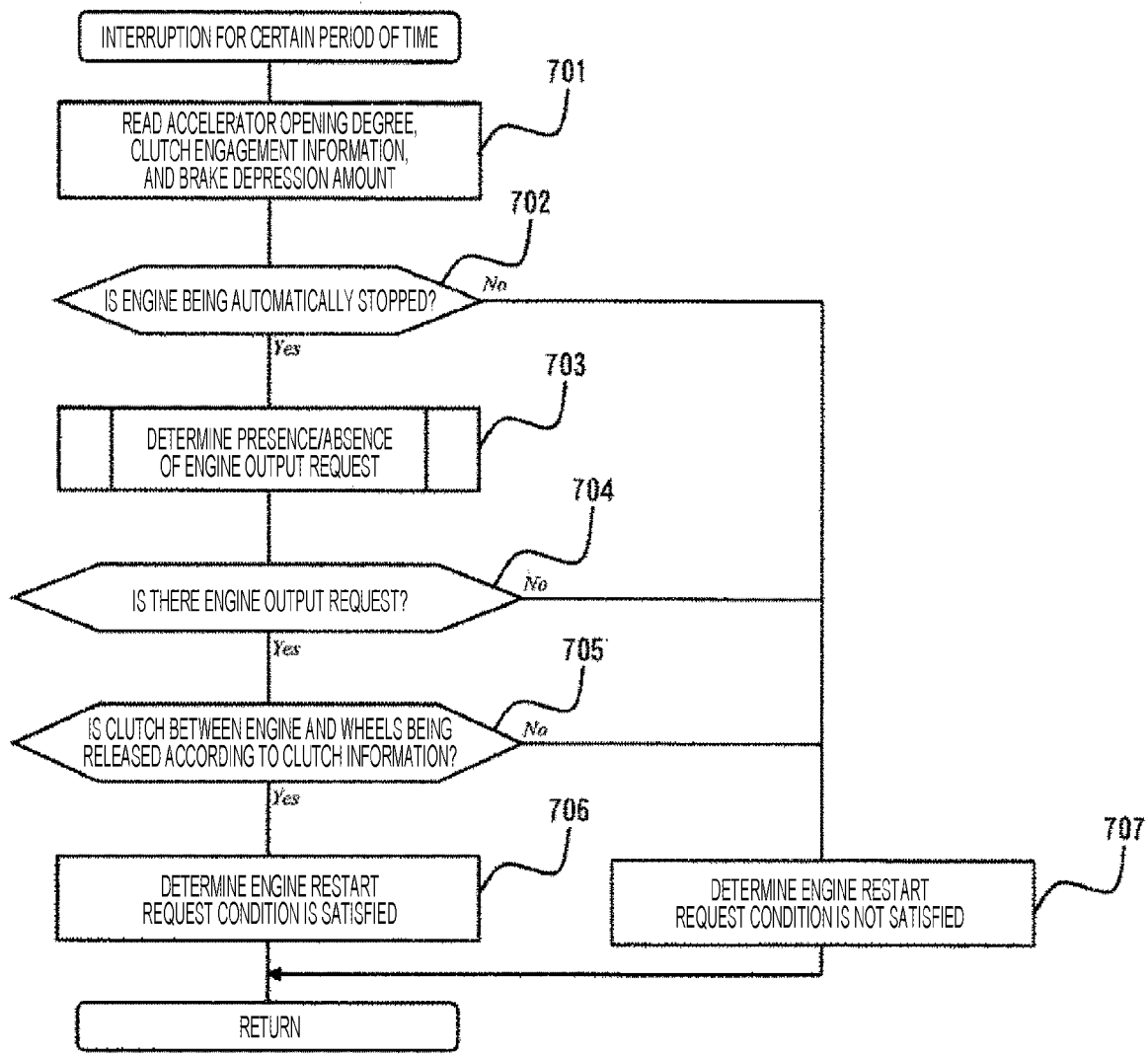
FIG. 7 is an exemplary flowchart of Step 403 of the vehicle control apparatus according to the present invention.

In accordance with the flowchart illustrated in FIG. 7, the engine restart request determination unit 403 determines the engine restart request from engine automatic stop determination information, the accelerator opening degree, the clutch engagement information acquired from the output of the TCU 124, the brake depression amount, and system restart request determination information.

FIG. 7 is an exemplary flowchart of the engine restart request determination unit 403 included in the CPU 201 of the ECU 110 illustrated in FIG. 4. In Step 701, the accelerator opening degree, the clutch engagement information, and the brake depression amount are read. In Step 702, it is determined whether the engine is being automatically stopped. When the determination is established, the process proceeds to Step 703 to be described later. Otherwise, the process proceeds to Step 707 to be described later. In Step 703, the engine output request is determined. In Step 704, it is determined whether there is the engine output request. When the determination is established, the process proceeds to Step 705 to be described later. Otherwise, the process proceeds to Step 707 to be described later.

In Step 705, it is determined from the clutch engagement information whether the clutch 130 between the engine 101 and the wheels 119L and 119R is disengaged. When the determination is established, the process proceeds to Step 706 to be described later. Otherwise, the process proceeds to Step 707 to be described later. In Step 706, it is determined that the engine restart request condition is satisfied. In Step 707, it is determined that the engine restart request condition is not satisfied.

Figure 8:
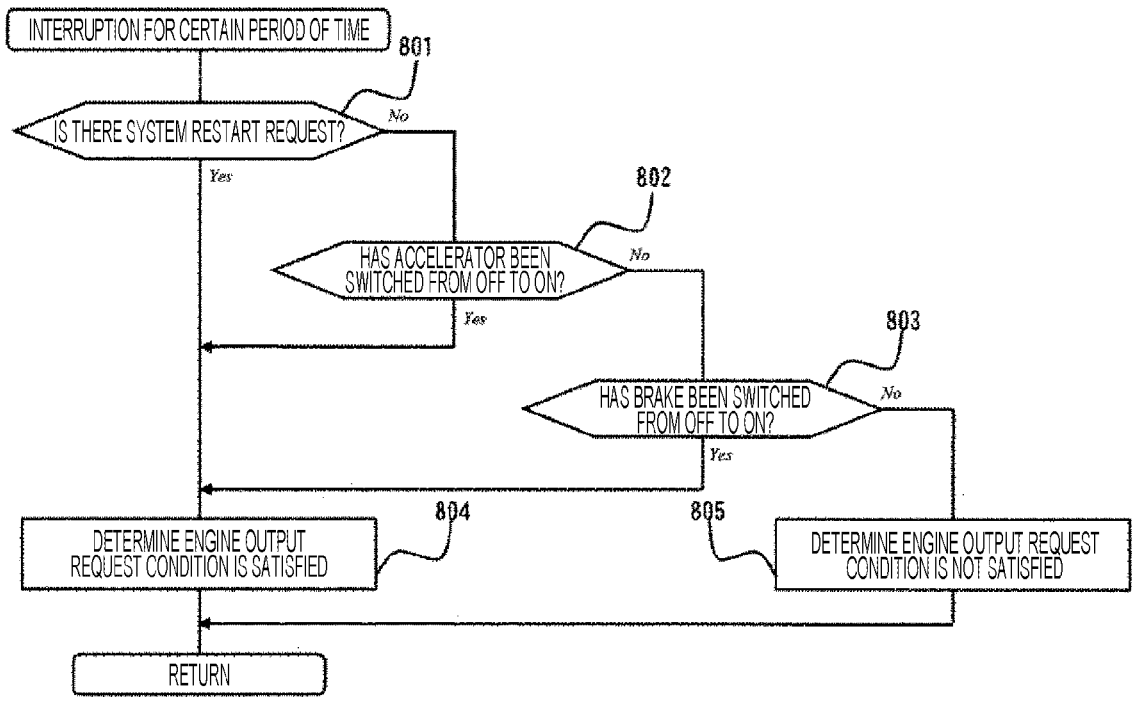
FIG. 8 is an exemplary flowchart of Step 703 of the vehicle control apparatus according to the present invention.

FIG. 8 is an exemplary flowchart of Step 703 of the flowchart illustrated in FIG. 7. In Step 801, it is determined whether there is a system restart request. When the determination is established, the process proceeds to Step 804 to be described later. Otherwise, the process proceeds to Step 802 to be described later. In Step 802, it is determined whether the accelerator has been switched from off to on. When the determination is established, the process proceeds to Step 804 to be described later. Otherwise, the process proceeds to Step 803 to be described later. In Step 803, it is determined whether the brake has been switched from off to on. When the determination is established, the process proceeds to Step 804 to be described later. Otherwise, the process proceeds to Step 805 to be described later. In Step 804, it is determined that the engine output request condition is satisfied. In Step 805, it is determined that the engine output request condition is not satisfied.

In accordance with the flowchart illustrated in FIG. 9, the clutch engagement restart request determination unit 404 determines a clutch engagement restart request from the engine restart request determination information, the vehicle speed, the brake depression amount, the system restart request determination information, and target deceleration level information calculated by a target deceleration level calculation unit 405 to be described later.

Figure 9:
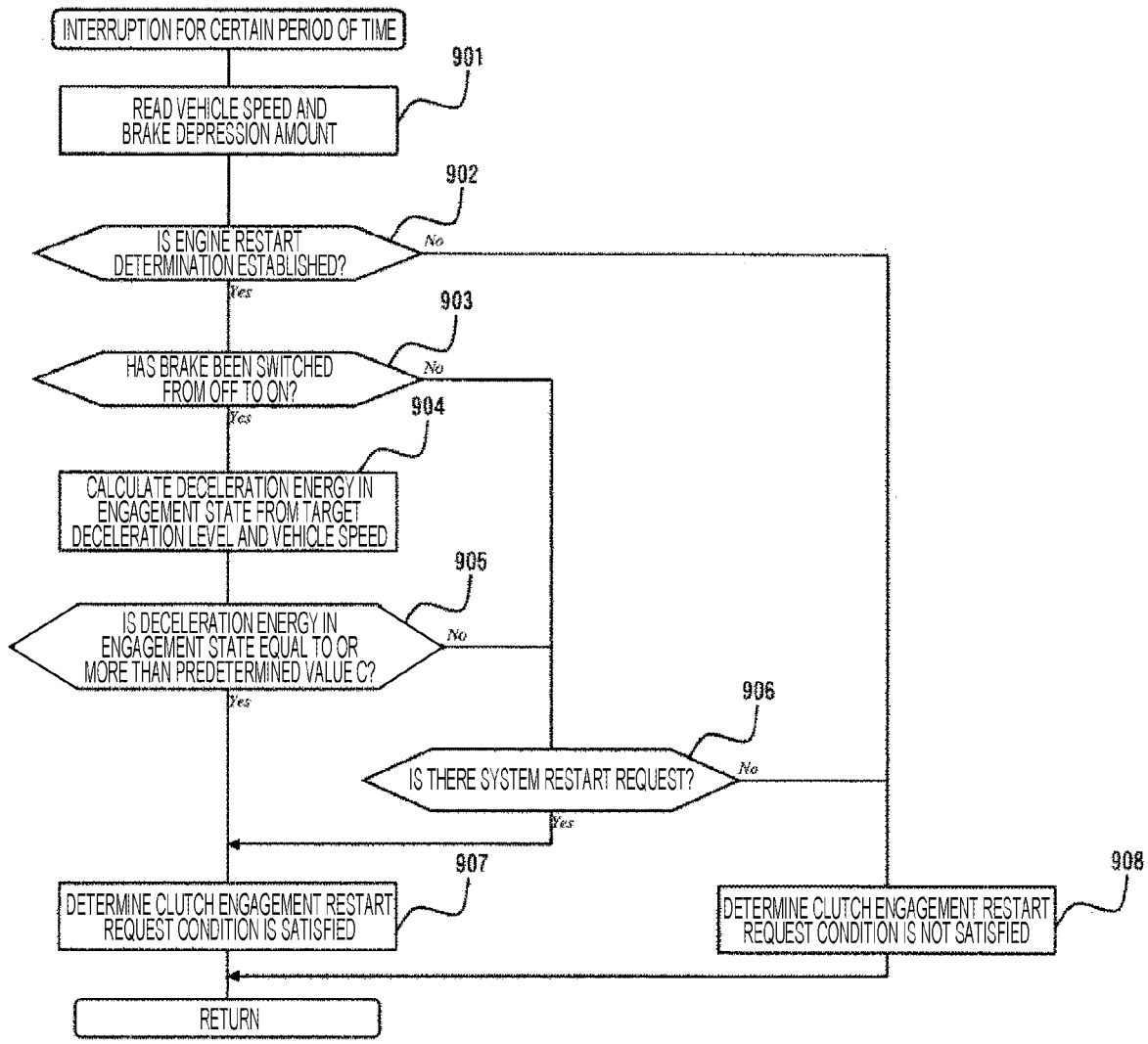
FIG. 9 is an exemplary flowchart of a block 404 of the vehicle control apparatus according to the present invention.

FIG. 9 is an exemplary flowchart of the clutch engagement restart request determination unit 404 included in the CPU 201 of the ECU 110 illustrated in FIG. 4. In Step 901, the vehicle speed and the brake depression amount are read. In Step 902, it is determined whether there is the engine restart request. When the determination is established, the process proceeds to Step 903 to be described later. Otherwise, the process proceeds to Step 908 to be described later. In Step 903, it is determined whether the brake has been switched from off to on. When the determination is established, the process proceeds to Step 904 to be described later. Otherwise, the process proceeds to Step 906 to be described later. In Step 904, deceleration energy at the time of the engagement is calculated from the target deceleration level and the vehicle speed. The deceleration energy at the time of the engagement may be a value estimated from the kinetic energy according to a formula (1) or a value acquired by searching a preset map with axes representing the target deceleration level and the vehicle speed.

[Formula 1]

$$E = \tfrac{1}{2}MV^2 \qquad (1)$$

Here, E represents kinetic energy, M represents vehicle weight, and V represents vehicle speed.

In Step 905, it is determined whether the deceleration energy in the engagement state is equal to or more than a predetermined value C. When the determination is established, the process proceeds to Step 907 to be described later. Otherwise, the process proceeds to Step 906 to be described later. Here, the predetermined value C is set to, for example, an energy value necessary for starting the engine by a clutch engagement. In Step 906, it is determined whether there is the system restart request. When the determination is established, the process proceeds to Step 907 to be described later. Otherwise, the process proceeds to Step 908 to be described later. In Step 907, it is determined that a clutch engagement restart request condition is satisfied. In Step 908, it is determined that the clutch engagement restart condition is not satisfied.

Figure 10:
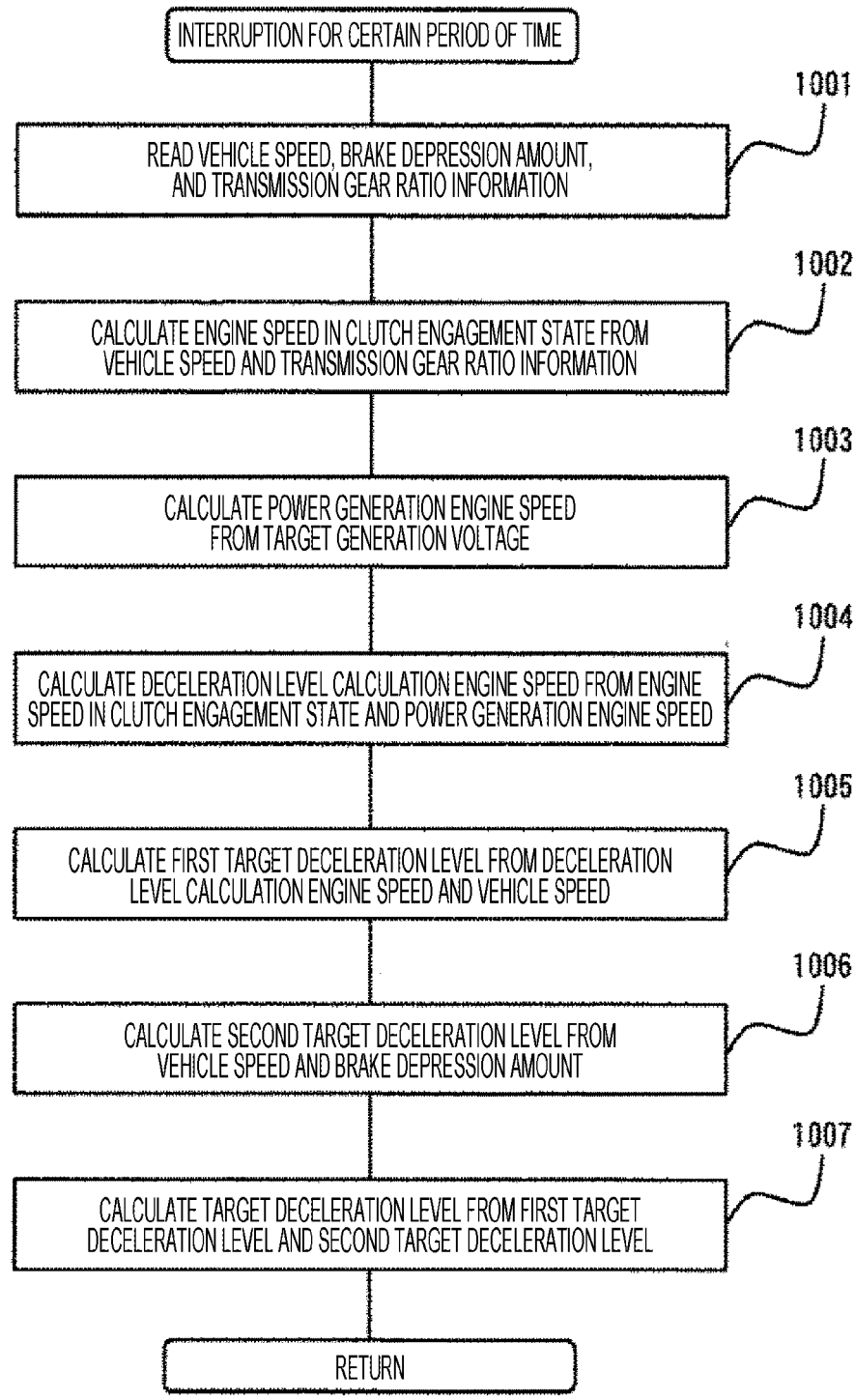
FIG. 10 is an exemplary flowchart of a block 405 of the vehicle control apparatus according to the present invention.

In accordance with the flowchart illustrated in FIG. 10, the target deceleration level calculation unit 405 calculates the target deceleration level from the vehicle speed, the brake depression amount, and transmission gear ratio information acquired from the output of the TCU 124. The transmission gear ratio information indicates information on the transmission gear ratio controlled by the TCU 124. The target deceleration level indicates a deceleration level that should be originally intended at the time of restarting the engine with the clutch 130 being engaged, which is indicated by a vehicle deceleration level 313 in FIG. 3. However, when the clutch 130 is actually engaged and the engine is restarted, the engagement is performed in a state where the wheels 119 are traveling at certain vehicle speed with the engine speed being zero, whereby a sudden deceleration is caused as indicated by the vehicle deceleration level 307 in FIG. 3.

FIG. 10 is an exemplary flowchart of the target deceleration level calculation unit 405 included in the CPU 201 of the ECU 110 illustrated in FIG. 4. In Step 1001, the brake depression amount, the vehicle speed, and the transmission gear ratio information are read. In Step 1002, the engine speed at the time of the clutch engagement is calculated from the vehicle speed and the transmission gear ratio information. The engine speed at the time of the clutch engagement may be a value acquired by searching a preset map with axes representing the vehicle speed and the transmission gear ratio information. In Step 1003, power generation engine speed is calculated from target generation voltage. In this step, in order to acquire a power generation amount required by the ECU 110 (target generation voltage), the power generation engine speed is calculated as the engine speed necessary for driving the generator 105. The power generation engine speed may be a value acquired by searching a preset table with an axis representing the target generation voltage. Incidentally, the power generation engine speed may include the engine speed that is required at a time when auxiliary machines such as an air conditioner are in operation.

Deceleration level calculation engine speed calculated in Step 1004, where such engine speed is calculated from the engine speed at the time of the clutch engagement and the power generation engine speed, may be an additional value of the engine speed at the time of the clutch engagement and the power generation engine speed or a value acquired by searching a preset map with axes representing the engine speed at the time of the clutch engagement and the power generation engine speed. In Step 1005, a first target deceleration level is calculated from the deceleration level calculation engine speed and the vehicle speed. The first target deceleration level may be a value estimated from the deceleration level $\alpha_e$ according to a formula (2) or a value acquired by searching a preset map with axes representing the deceleration level calculation engine speed and the vehicle speed.

[Formula 2]

$$\alpha_e = -\frac{1}{M}C_d S V^2 - \mu g - g\sin\theta - \frac{F_e}{M} \qquad (2)$$

Here, M represents a vehicle weight, $C_d$ represents an air resistance coefficient, S represents a frontal projected area of the vehicle, V represents vehicle speed, μ represents a rolling resistance coefficient, g represents gravitational acceleration, θ represents a road gradient, and $F_e$ represents an engine loss torque at the time of the clutch engagement with the fuel injection to the engine being stopped. Since the engine loss torque $F_e$ varies depending on the deceleration level calculation engine speed, a value acquired by searching a preset table with an axis representing the deceleration level calculation engine speed may be used. In Step 1006, a second target deceleration level is calculated from the vehicle speed and the brake depression amount. The second target deceleration level may be a value acquired by searching the preset map with the axes representing the vehicle speed and the brake depression amount. In Step 1007, a target deceleration level is calculated from the first target deceleration level and the second target deceleration level. The target deceleration level may be an additional value of the first target deceleration level and the second target deceleration level or a value acquired by searching a preset map with axes representing the first target deceleration level and the second target deceleration level.

As described above, since, in reality, a sudden deceleration is caused as indicated by the vehicle deceleration level 307 in FIG. 3, a vehicle deceleration level calculation unit 406 calculates the vehicle deceleration level of an actual vehicle from the transmission gear ratio information acquired from the output of the TCU 124, the vehicle speed, and the engine speed.

Figure 11:
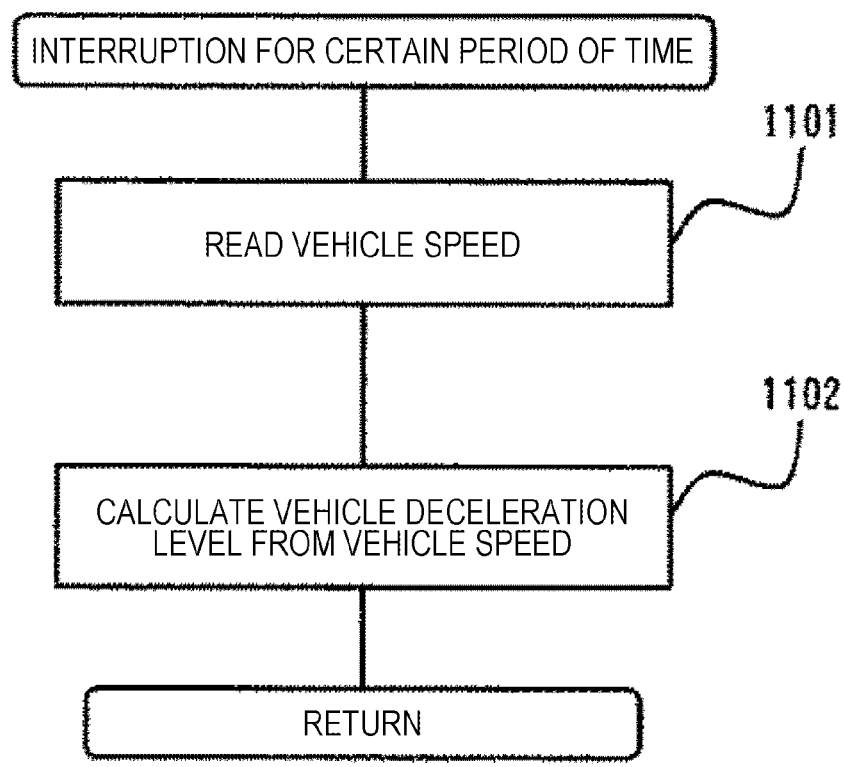
FIG. 11 is an exemplary flowchart of a block 406 of the vehicle control apparatus according to the present invention.

FIG. 11 is an exemplary flowchart of the vehicle deceleration level calculation unit 406 included in the CPU 201 of the ECU 110 illustrated in FIG. 4. In Step 1101, the vehicle speed is read. In Step 1102, a change amount of the vehicle speed per unit time is calculated and output as the vehicle deceleration level.

Figure 12:
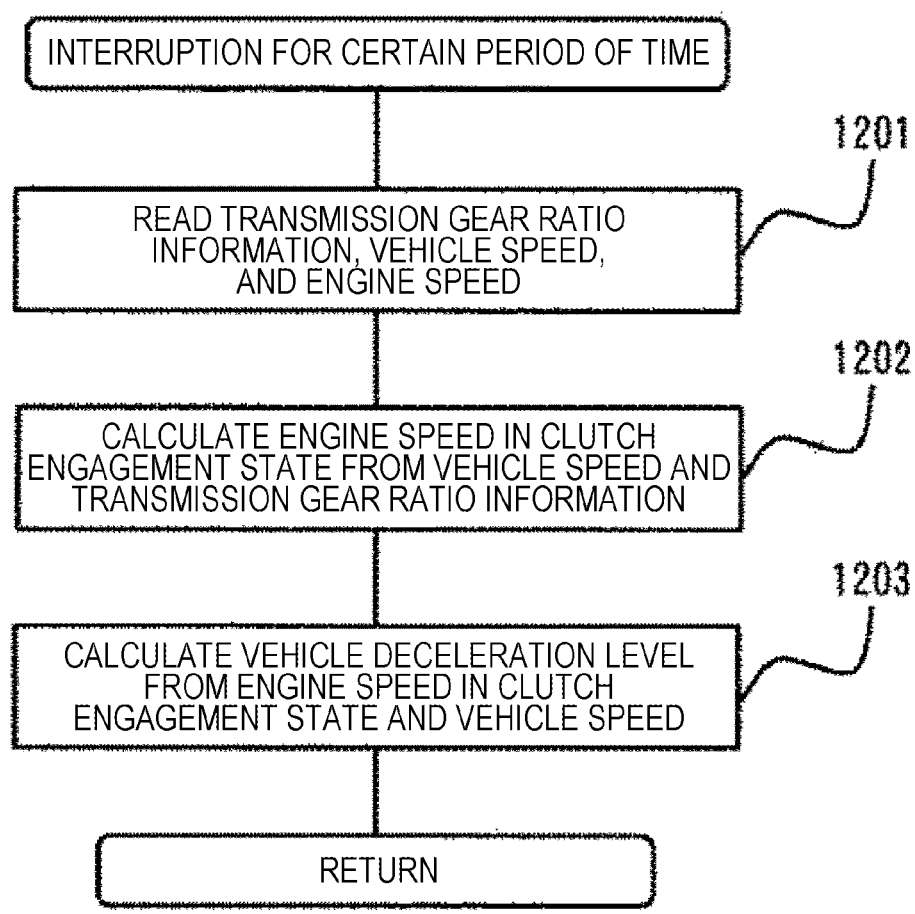
FIG. 12 is an exemplary flowchart of the block 406 of the vehicle control apparatus according to the present invention.

FIG. 12 is an exemplary flowchart of a block 406 in FIG. 4 with respect to the vehicle control apparatus according to the present embodiment. In Step 1201, the transmission gear ratio information, the vehicle speed, and the engine speed are read. In Step 1202, the engine speed at the time of the clutch engagement is calculated from the vehicle speed and the transmission gear ratio information. The engine speed at the time of the clutch engagement may be a value acquired by searching the preset map with the axes representing the vehicle speed and the transmission gear ratio information. In Step 1203, the vehicle deceleration level is calculated from the engine speed at the time of the clutch engagement and the vehicle speed. The vehicle deceleration level may be a value estimated from the deceleration level $\alpha_e$ according to the formula (2) or a value acquired by searching a preset map with axes representing the engine speed at the time of the clutch engagement and the vehicle speed.

Then, the vehicle deceleration level control unit 407 controls the deceleration level of the vehicle 100 on the basis of the brake depression amount, the target deceleration level information calculated by the target deceleration level calculation unit 405, vehicle deceleration level information of the actual vehicle calculated by the vehicle deceleration level calculation unit 406, and clutch engagement restart request determination information. For that purpose, brake device hydraulic pressure, a target transmission gear ratio, and the clutch engagement amount, which are necessary for performing control, are determined. The vehicle deceleration level control unit 407 controls, although a detailed method of control will be described later, the hydraulic pressure of the brake device (FIGS. 3 and 10), the target transmission gear ratio (FIGS. 14 and 15), or the clutch engagement amount (FIGS. 16 and 17) so that the vehicle deceleration level of the actual vehicle calculated by the vehicle deceleration level calculation unit 406 becomes the target deceleration level calculated by the target deceleration level calculation unit 405.

As will be described in a fourth embodiment, a fuel injection amount control unit 408 controls a fuel injection amount for reducing catalyst performance. The fuel injection amount control unit 408 controls, although details will be described in the fourth embodiment, the fuel injection amount on the basis of the clutch engagement restart request determination information, the engine automatic stop determination information, an intake air amount, intake pipe pressure, and the engine speed. Accordingly, an operation amount of the fuel injection valve 121 necessary for performing control is determined.

Figure 5:
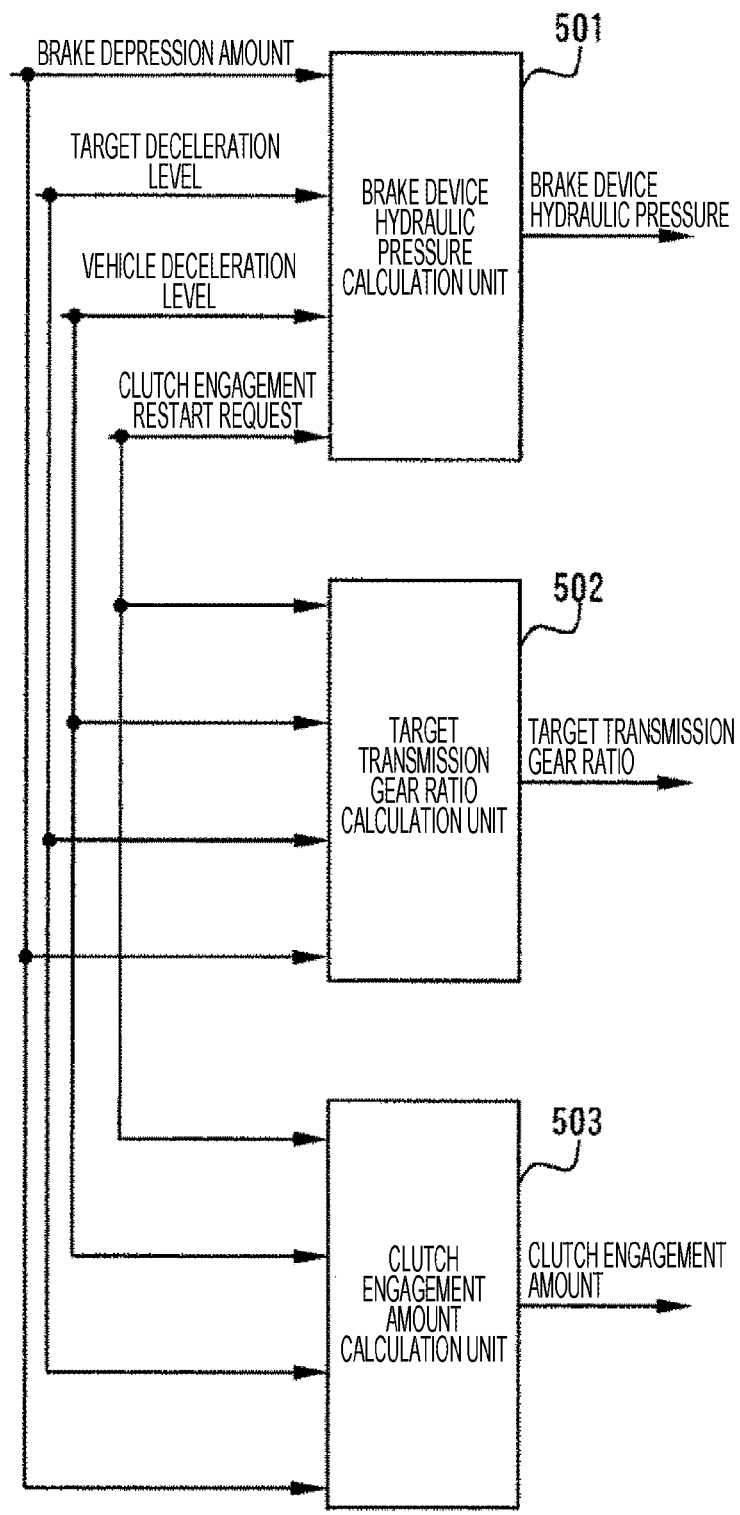
FIG. 5 is an exemplary detailed block of a block 407 of the vehicle control apparatus according to the present invention.

FIG. 5 is a diagram describing a detailed block configuration of the vehicle deceleration level control unit 407 illustrated in FIG. 4. The vehicle deceleration level control unit 407 controls an actual deceleration level by a brake device hydraulic pressure calculation unit 501, a target transmission gear ratio calculation unit 502, or a clutch engagement amount calculation unit 503 so that the vehicle deceleration level of the actual vehicle calculated by the vehicle deceleration level calculation unit 406 becomes the target deceleration level calculated by the target deceleration level calculation unit 405. The deceleration level may be controlled by any one or combination of the components mentioned above.

Specifically, the brake device hydraulic pressure calculation unit 501 determines the brake device hydraulic pressure necessary for controlling the deceleration level of the vehicle 100 from the brake depression amount, the target deceleration level information, the vehicle deceleration level information, and the clutch engagement restart request determination information. The brake device hydraulic pressure is transmitted to the HU 136, and the HU 136 optimally controls the braking force of the brake on the basis of the brake device hydraulic pressure and information on the engine side including the brake depression amount.

The target transmission gear ratio calculation unit 502 calculates the target transmission gear ratio from the clutch engagement restart request determination information, the vehicle deceleration level information, the target deceleration level information, and the brake depression amount. The target transmission gear ratio is transmitted to the TCU 124, and the TCU 124 optimally controls the transmission gear ratio on the basis of the target transmission gear ratio, the information on the engine side (engine speed, vehicle speed, and throttle opening degree) that is calculated by the clutch engagement amount calculation unit 503 to be described later and includes the clutch engagement amount, and information on the transmission side.

The clutch engagement amount calculation unit 503 calculates the clutch engagement amount from the clutch engagement restart request determination information, the vehicle deceleration level information, the target deceleration level information, and the brake depression amount. The clutch engagement amount is transmitted to the TCU 124, and the TCU 124 optimally controls the clutch on the basis of the information on the engine side (engine speed, vehicle speed, and throttle opening degree) including the clutch engagement amount and the information on the transmission side.

Figure 13:
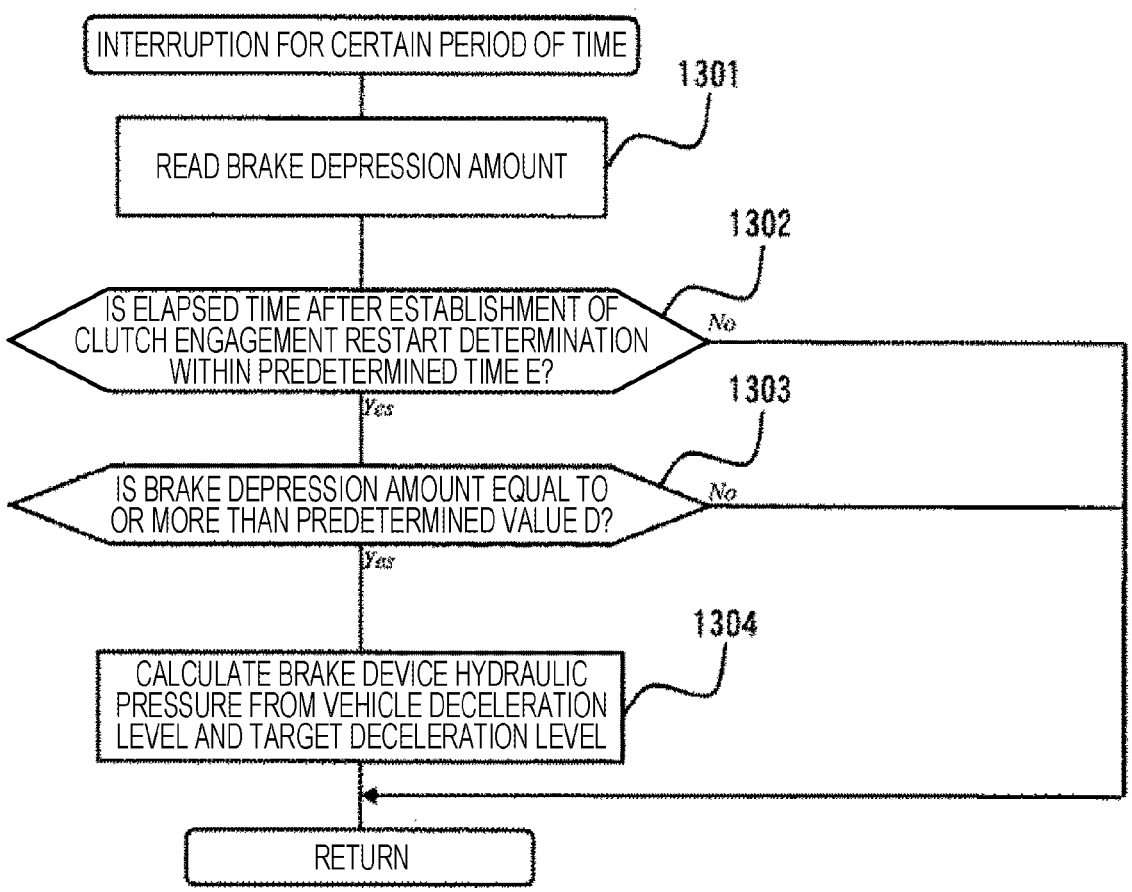
FIG. 13 is an exemplary flowchart of a block 501 of the vehicle control apparatus according to the present invention.

FIG. 13 is an exemplary flowchart of the brake device hydraulic pressure calculation unit 501 included in the CPU 201 of the ECU 110 illustrated in FIG. 5. In Step 1301, the brake depression amount is read. In Step 1302, it is determined whether an elapsed time after establishment of a clutch engagement restart is within a predetermined time E. When the determination is established, the process proceeds to Step 1303 to be described later. Otherwise, no specific processing is performed and the process of the present flowchart is terminated. The elapsed time is cleared when the clutch engagement restart is established. Here, the predetermined time E is set to, for example, a value with which to determine the clutch engagement is complete and generation of the deceleration caused by the engagement is stopped.

In Step 1303, it is determined whether the brake depression amount is equal to or more than a predetermined value D. When the determination is established, the process proceeds to Step 1304 to be described later. Otherwise, no specific processing is performed and the process of the present flowchart is terminated. Here, the predetermined value D is set to, for example, a brake depression amount at which the hydraulic pressure of the brake device becomes operational. In Step 1304, a hydraulic pressure of the brake device is calculated from the vehicle deceleration level and the target deceleration level. The brake device hydraulic pressure may be a value acquired by searching a preset table with an axis representing a deviation between the vehicle deceleration level and the target deceleration level or a value acquired by searching a preset map with axes representing the vehicle deceleration level and the target deceleration level.

As described above, the CPU (control unit) 201 of the ECU 110 according to the present embodiment includes the deceleration level control unit 407 that controls the actual deceleration level of the vehicle 100 such that, during travelling of the vehicle 100 continuing to travel with the clutch 130 between the engine 101 and the wheels 119L and 119R being disengaged, when the deceleration request is made and the engine 101 is started by the engagement of the clutch 130, the deceleration level becomes the target deceleration level calculated from the first target deceleration level generated after the engagement of the clutch 130 is complete and the second target deceleration level generated in response to the deceleration request.

A method for calculating the first target deceleration level and the second target deceleration level is as described above. The first target deceleration level is based on what is called an engine braking, and the second target deceleration level is based on the brake depression amount. Although these deceleration levels are ideal, in reality, a sudden deceleration is caused as indicated by the vehicle deceleration level 307 in FIG. 3, whereby the drivability may be lowered. In view of the above, the deceleration level control unit 407 performs control so that the vehicle deceleration level of the actual vehicle calculated by the vehicle deceleration level calculation unit 406 becomes the target deceleration level calculated by the target deceleration level calculation unit 405.

Accordingly, at the time point 311 in FIG. 3, when the clutch 130 is engaged by the clutch engagement command 303 turned on and the engine 101 is restarted, the braking torque can be reduced from the braking torque 306 to the braking torque 312. As a result, the deceleration level of the vehicle 100, which is caused by the first target deceleration level generated after the engagement of the clutch 130 is complete and the second target deceleration level generated in response to the deceleration request, can be reduced from the vehicle deceleration level 307 to the vehicle deceleration level 313, whereby lowering of the drivability can be prevented.

Since the engine 101 is restarted by the engagement of the clutch 130, it is not required to restart (perform cranking) the engine 101 by activating the starter 104. Accordingly, the number of activations of the starter 104 can be reduced, whereby deterioration of durability of the starter 104 can be prevented.

In the configuration described above, it is preferable that the deceleration request is generated by the driver's operation of the brake pedal. When the deceleration request is generated by the depressing operation of the brake pedal 117, the engine 101 is restarted by the engagement of the clutch 130 so that the engine speed is increased from the cranking state. Accordingly, it is not required to restart the fuel injection, whereby fuel consumption can be reduced.

Further, according to this configuration, at the time point 311 in FIG. 3, the deceleration level of the vehicle 100 is controlled in response to the driver's deceleration request based on the operation of the brake pedal 117, whereby the deceleration level can be controlled in accordance with the driver's deceleration intention.

In addition, in the configuration described above, it is preferable that the generator 105 that generates electric power corresponding to the rotation of the engine 101 is provided, and the deceleration level control unit 407 controls, on the basis of the power generation amount of the generator 105, the deceleration level caused by the first target deceleration level and the second target deceleration level.

Originally, as indicated in Step 1002, the rotation speed of the engine rotation 101 required for engaging the clutch 130 is calculated from the vehicle speed and the transmission gear ratio information (engine speed in the clutch engagement state in Step 1002). Meanwhile, when the generator 105 generates electric power, it is required to increase the rotation speed of the engine 101 in accordance with the power generation amount. This required rotation speed is the power generation engine speed in Step 1003. This is requested by the ECU 110 side on the basis of a voltage drop occurrence of the battery 106 and the like. Therefore, for example, when the power generation engine speed is higher than the engine speed at the time of the clutch engagement, the rotation speed of the engine 103 after the engagement of the clutch 130 is complete increases, and the deceleration level increases. In view of the above, on the basis of the processing in Steps 1004 and 1005, the first target deceleration level is calculated considering the power generation engine speed.

More specifically, while the method for calculating the first target deceleration level is as described above, that is, the first target deceleration level is based on what is called the engine braking, the first target deceleration level is set by preliminarily deducting, from the foregoing deceleration level, the deceleration level caused by the engine speed at the time of the clutch engagement, the power generation engine speed, and the transmission gear ratio. Then, the deceleration level control unit 407 controls the vehicle deceleration level of the actual vehicle calculated by the vehicle deceleration level calculation unit 406 such that the deceleration level becomes the target deceleration level calculated by the modified first target deceleration level and the second target deceleration level.

More specifically, in the configuration described above, it is preferable that the deceleration level control unit 407 controls a braking amount of the brake devices for the wheels 119L and 119R so that the deceleration level of the vehicle 100 becomes the target deceleration level calculated from the first target deceleration level and the second deceleration level.

According to the configuration described above, the deceleration level of the vehicle 100 can be controlled by controlling the braking amount of the brake devices (braking devices) for the wheels 119L and 119R such as the brake pads 132L and 132R.

In addition, in the configuration described above, it is preferable that the deceleration level control unit 407 controls the hydraulic pressure generated by the operation of the brake pedal 117 or the hydraulic pressure by which the brake pads 132L and 132R are operated so that the deceleration level of the vehicle 100 becomes the target deceleration level calculated from the first target deceleration level and the second deceleration level.

According to the configuration described above, the hydraulic pressure generated by the operation of the brake pedal 117 or the hydraulic pressure by which the brake pads 132L and 132R are operated are controlled from the brake device hydraulic pressure 308 to a brake device hydraulic pressure 314 illustrated in FIG. 3 so that the braking force of the brake devices for the wheels 119L and 119R can be controlled, whereby the deceleration level of the vehicle 100 can be controlled.

Second Embodiment

A second embodiment of the present invention will be described with reference to FIGS. 14 and 15.

A problem to be solved by a vehicle control apparatus according to the present embodiment will be described below with reference to FIG. 14, but the contents are similar to those of the first embodiment. Note that FIG. 14 is an example of behavior of a vehicle deceleration level in a case where a deceleration request is made and an engine 101 is started by an engagement of a clutch 130 with respect to the vehicle control apparatus according to the present invention.

Figure 14:
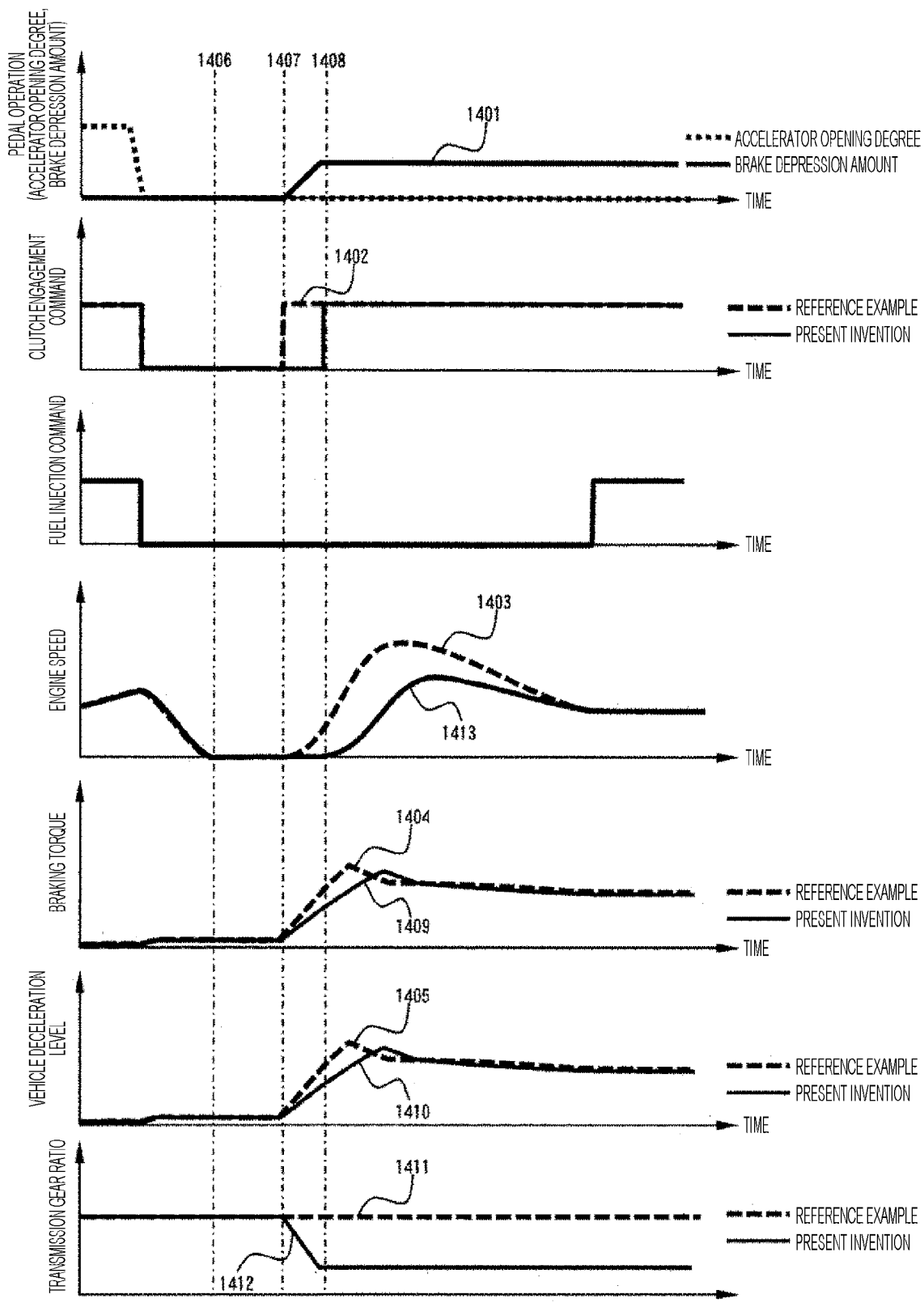
FIG. 14 is an example of the behavior of the vehicle deceleration level in the case where the deceleration request is made and the engine 101 is started by the engagement of the clutch 130 with respect to the vehicle control apparatus according to the present invention.

At a time point 1406 during travelling of a vehicle illustrated in FIG. 14, a vehicle 100 coasts in such a manner that the clutch 130 is disengaged and an engine is stopped with engine speed 1403 being zero. At a time point 1407 during coasting, when a brake depression amount 1401 caused by an operation of a driver exceeds zero, in other words, when a depressing operation of a brake pedal 117 is performed by the driver, the clutch 130 is engaged, without starting a starter 104, on the basis of a clutch engagement command 1402 turned on, thereby restarting the engine 101.

At this time, a braking torque 1404 is generated by a braking torque that is generated after an engagement of the clutch 130 is complete and another braking torque that is generated in response to the deceleration request generated by the depressing operation of the brake pedal 117.

However, in this case, the engagement is performed in a state where the engine speed 1403 is zero, that is, in a state where a deviation occurs between the engine speed and vehicle speed (rotation speed of wheels), whereby the braking torque 1404 rapidly increases at a time immediately after the time point 1407 at the start of the engagement. As a result, a vehicle deceleration level 1405 also rapidly increases so that what is called an engagement shock is increased, thereby lowering drivability. In view of the above, it is an object of the present embodiment to provide a vehicle control apparatus capable of controlling a deceleration level of the vehicle 100 on the basis of vehicle speed when the engine 101 is started by an engagement of the clutch 130.

Figure 15:
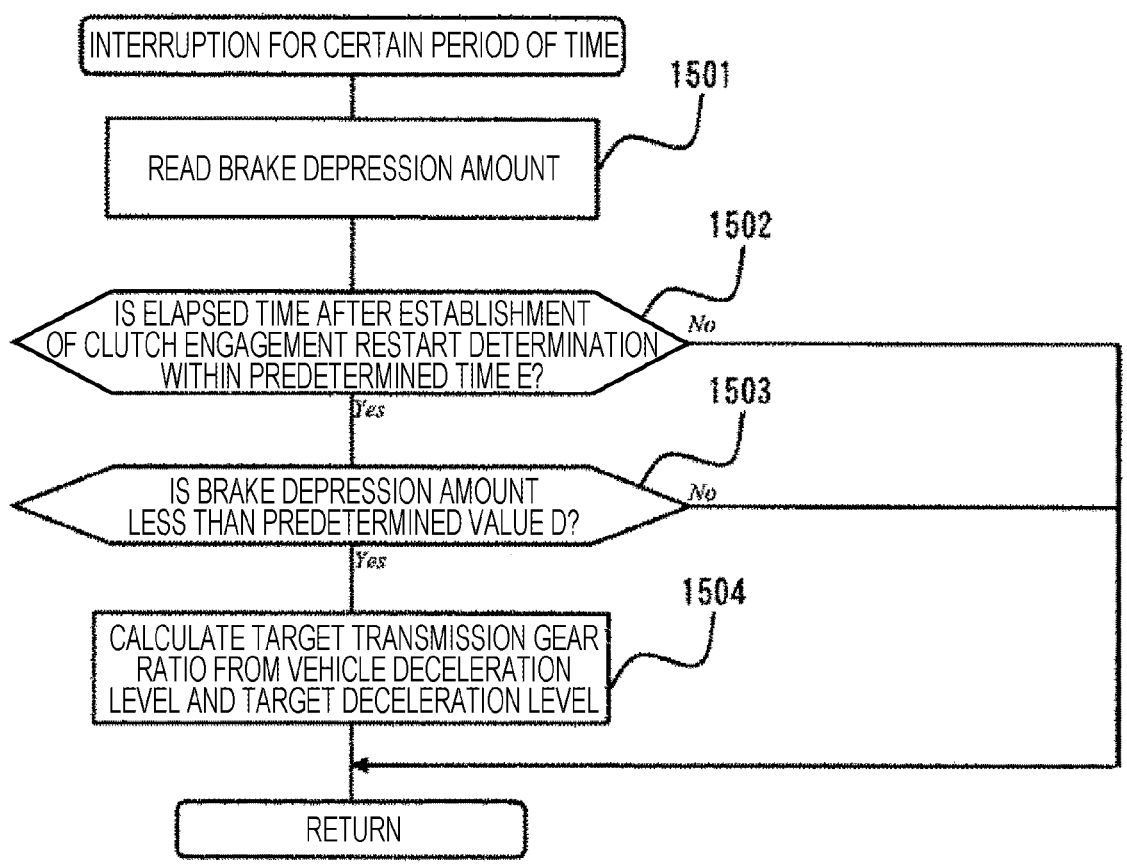
FIG. 15 is an exemplary flowchart of a block 502 of the vehicle control apparatus according to the present invention.

FIG. 15 is an exemplary flowchart of a target transmission gear ratio calculation unit 502 illustrated in FIG. 5 with respect to the vehicle control apparatus according to the present embodiment. In Step 1501, the brake depression amount is read. In Step 1502, it is determined whether an elapsed time after establishment of a clutch engagement restart is within a predetermined time E. When the determination is established, the process proceeds to Step 1503 described later. Otherwise, no specific processing is performed and the process of the present flowchart is terminated. The elapsed time is cleared when the clutch engagement restart is established. The predetermined value E is set to, for example, a value similar to that in Step 1302 described above. In Step 1503, it is determined whether the brake depression amount is less than a predetermined value D. When the determination is established, the process proceeds to Step 1504 described later. Otherwise, no specific processing is performed and the process of the present flowchart is terminated. The predetermined value D is set to, for example, a value similar to that in Step 1303 described above.

In Step 1504, a target transmission gear ratio is calculated from the vehicle deceleration level and a target deceleration level. Here, a method for calculating a first target deceleration level and a second target deceleration level is as described in the first embodiment. The first target deceleration level is based on what is called an engine braking, and the second target deceleration level is based on the brake depression amount. Although these deceleration levels are ideal, in reality, a sudden deceleration is caused as indicated by the vehicle deceleration level 1405 in FIG. 14, whereby the drivability may be lowered. In view of the above, the deceleration level control unit 407 performs control so that the vehicle deceleration level of the actual vehicle calculated by the vehicle deceleration level calculation unit 406 becomes the target deceleration level calculated by the target deceleration level calculation unit 405.

The target transmission gear ratio may be a value acquired by searching a preset table with an axis representing a deviation between the vehicle deceleration level and the target deceleration level or a value acquired by searching a preset map with axes representing the vehicle deceleration level and the target deceleration level. Specifically, as illustrated in FIG. 14, control is performed such that the clutch 130 is engaged by a clutch engagement restart request determination unit 404 after the transmission gear ratio is reduced by the target transmission gear ratio calculation unit 502 of the deceleration level control unit 407, and also the engine is restarted by an engine restart request determination unit 403.

Since the transmission gear ratio, as indicated by the transmission gear ratio 1412, is decreased relative to the transmission gear ratio 1411 of a reference example to which the present embodiment is not applied, a rate of increase of the engine speed after an engine restart, as indicated by the engine speed 1413, is decreased relative to the engine speed 1403 of the reference example. Therefore, the braking torque when the clutch 130 is engaged, as indicated by the braking torque 1409, can be made smaller than the braking torque 1404 of the reference example, whereby the vehicle deceleration level, as indicated by the vehicle deceleration level 1410, can be made smaller than the vehicle deceleration level 1405 of the reference example.

As described above, the vehicle control apparatus according to the present embodiment includes the deceleration level control unit 407 that controls the deceleration level of the vehicle 100 such that, during travelling of the vehicle 100 continuing to travel with the clutch 130 between the engine 101 and wheels 119L and 119R being disengaged, when the deceleration request is made and the engine 101 is started by the engagement of the clutch 130, the deceleration level becomes the target deceleration level calculated from the first target deceleration level generated after the engagement of the clutch 130 is complete and the second target deceleration level generated in response to the deceleration request. The deceleration level control unit 407 controls the transmission gear ratio of the transmission 103 coupled to the engine 101 using the target transmission gear ratio calculation unit 502 so that the deceleration level of the vehicle 100 becomes the target deceleration level calculated from the first target deceleration level and the second deceleration level.

According to the configuration described above, when the engine 101 is restarted by the engagement of the clutch 130, the transmission gear ratio of the transmission 130 coupled to the engine 101 is controlled from the transmission gear ratio 1411 to the transmission gear ratio 1412 illustrated in FIG. 14 so that the braking torque of the vehicle 100 that rapidly increases at a time point 1408 that is immediately after the engagement can be reduced from the braking torque 1404 to the braking torque 1409. As a result, the deceleration level of the vehicle 100 generated after the engagement of the clutch 130 is complete can be reduced from the vehicle deceleration level 1405 to the vehicle deceleration level 1410 that is the target deceleration level, whereby lowering of the drivability can be prevented.

Third Embodiment

A third embodiment of the present invention will be described with reference to FIGS. 16 and 17.

A problem to be solved by a vehicle control apparatus according to the present embodiment will be described below with reference to FIG. 16, but the contents are similar to those of the first embodiment. Note that FIG. 16 is an example of behavior of a vehicle deceleration level in a case where a deceleration request is made and an engine 101 is started by an engagement of a clutch 130 with respect to the vehicle control apparatus according to the present invention.

Figure 16:
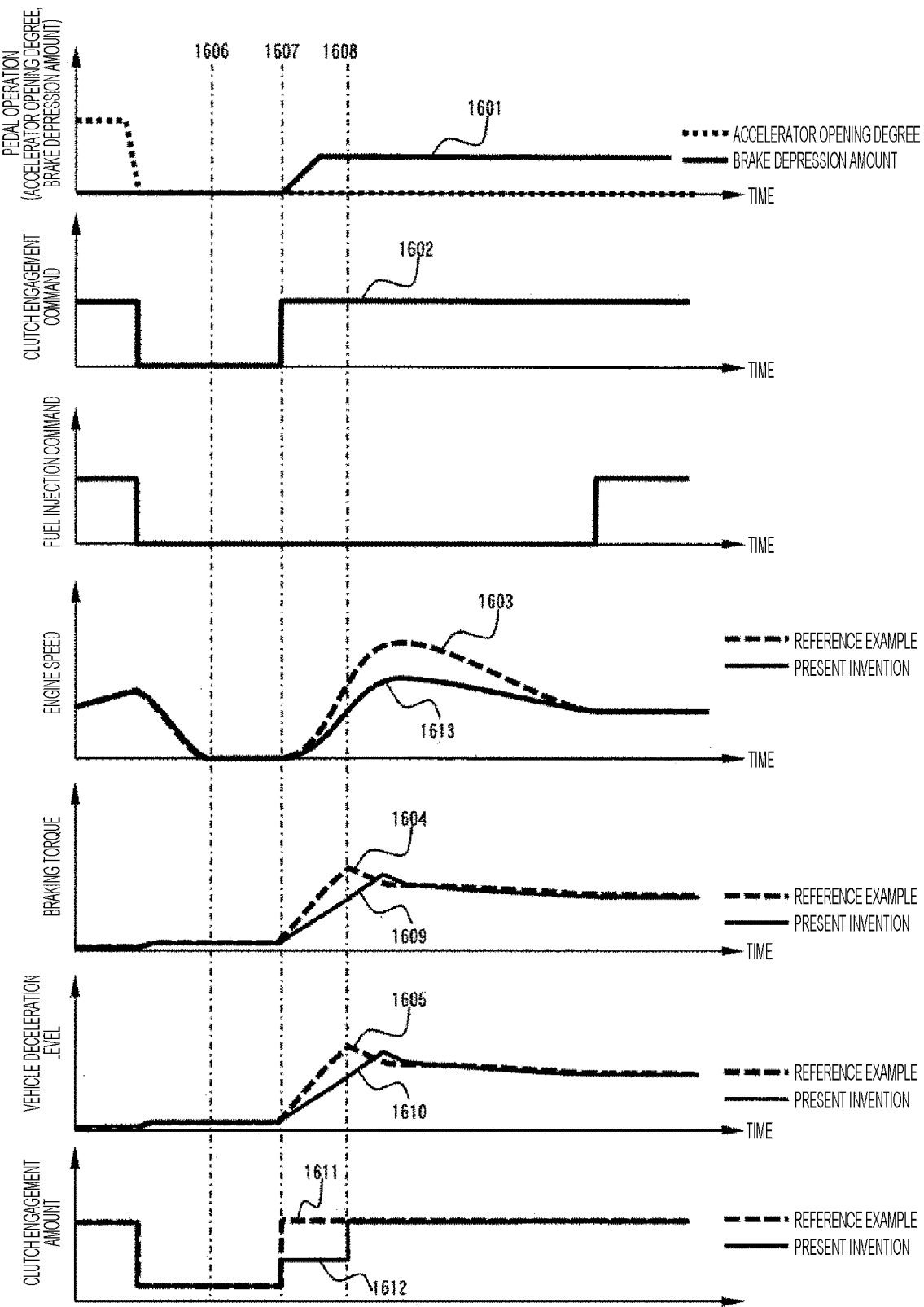
FIG. 16 is an example of the behavior of the vehicle deceleration level in the case where the deceleration request is made and the engine 101 is started by the engagement of the clutch 130 with respect to the vehicle control apparatus according to the present invention.
Figure 17:
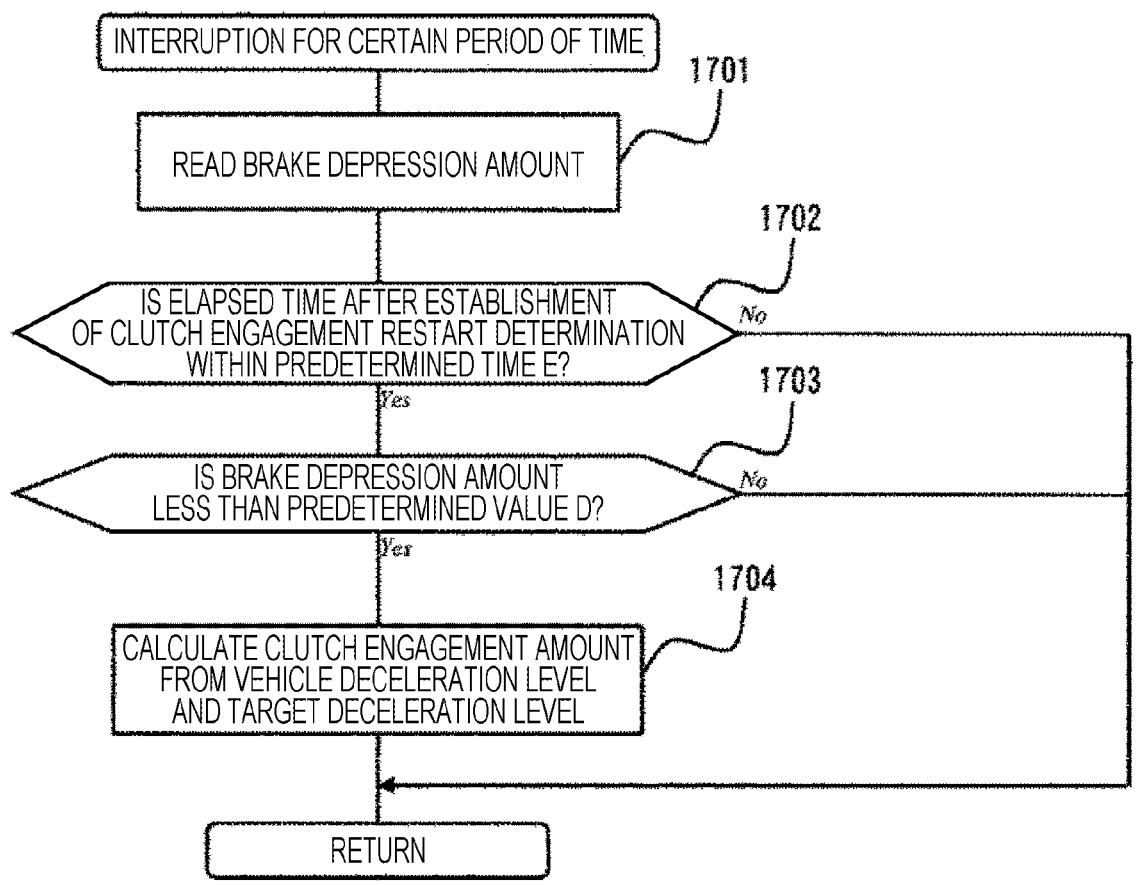
FIG. 17 is an exemplary flowchart of a block 503 of the vehicle control apparatus according to the present invention.

At a time point 1606 during travelling of a vehicle illustrated in FIG. 16, a vehicle 100 coasts in such a manner that the clutch 130 is disengaged and an engine is stopped with engine speed 1603 being zero. At a time point 1607 during coasting, when a brake depression amount 1601 caused by an operation of a driver exceeds zero, in other words, when a depressing operation of a brake pedal 117 is performed by the driver, the clutch 130 is engaged, without starting a starter 104, on the basis of a clutch engagement command 1602 turned on, thereby restarting the engine 101. At this time, a braking torque 1604 is generated by a braking torque that is generated after an engagement of the clutch 130 is complete and another braking torque that is generated in response to the deceleration request generated by the depressing operation of the brake pedal 117. However, in this case, the engagement is performed in a state where the engine speed 1603 is zero, that is, in a state where a deviation occurs between the engine speed and vehicle speed (rotation speed of wheels), whereby the braking torque 1604 rapidly increases at a time immediately after the time point 1607 where the engagement is started. As a result, a vehicle deceleration level 1605 also rapidly increases so that what is called an engagement shock is increased, thereby lowering drivability. In view of the above, it is an object of the present embodiment to provide a vehicle control apparatus capable of controlling a deceleration level of the vehicle 100 on the basis of vehicle speed when the engine 101 is started by an engagement of the clutch 130.

Characteristics of the above-described present embodiment will be described with reference to FIG. 17. FIG. 17 is an exemplary flowchart of a block 503 in FIG. 5 with respect to the vehicle control apparatus as an object of the present invention. In Step 1701, a brake depression amount is read. In Step 1702, it is determined whether an elapsed time after establishment of a clutch engagement restart is within a predetermined time E. When the determination is established, the process proceeds to Step 1703 to be described later. Otherwise, no specific processing is performed and the process of the present flowchart is terminated. The elapsed time is cleared when the clutch engagement restart is established. The predetermined value E is set to, for example, a value similar to that in Step 1302 described above. In Step 1703, it is determined whether the brake depression amount is less than a predetermined value D. When the determination is established, the process proceeds to Step 1704 to be described later. Otherwise, no specific processing is performed and the process of the present flowchart is terminated. The predetermined value D is set to, for example, a value similar to that in Step 1303 described above. In Step 1704, a clutch engagement amount is calculated from the vehicle deceleration level and a target deceleration level. The clutch engagement amount may be a value acquired by searching a preset table with an axis representing a deviation between the vehicle deceleration level and the target deceleration level or a value acquired by searching a preset map with axes representing the vehicle deceleration level and the target deceleration level.

As illustrated in the drawings mentioned above, the vehicle control apparatus according to the present embodiment includes a deceleration level control unit 407 that controls the deceleration level of the vehicle 100 such that, during travelling of the vehicle 100 continuing to travel with the clutch 130 between the engine 101 and wheels 119L and 119R being disengaged, when the deceleration request is made and the engine 101 is started by the engagement of the clutch 130, the deceleration level becomes the target deceleration level calculated from a first target deceleration level generated after the engagement of the clutch 130 is complete and a second target deceleration level generated in response to the deceleration request.

The deceleration level control unit 407 controls an engagement degree of the clutch 130 so that the deceleration level of the vehicle 100 becomes the target deceleration level calculated from the first target deceleration level and the second target deceleration level.

According to the configuration described above, when the engine 101 is restarted by the engagement of the clutch 130, the engagement amount of the clutch 130 is controlled, between the time point 1607 and a time point 1608 in FIG. 16, from a clutch engagement amount 1611 to a clutch engagement amount 1612 so that the braking torque of the vehicle 100 that rapidly increases at the time point 1608 that is immediately after the engagement can be reduced from the braking torque 1604 to the braking torque 1609. As a result, the deceleration level of the vehicle 100 generated after the engagement of the clutch 130 is complete can be reduced from the vehicle deceleration level 1605 to a vehicle deceleration level 1610, whereby lowering of the drivability can be prevented. This control is performed on the basis of control blocks illustrated in FIG. 4. In particular, in blocks 405 and 407, the deceleration level caused by the first target deceleration level and the second target deceleration level is controlled in accordance with the vehicle speed, whereby the braking torque 1609 and the vehicle deceleration level 1610 can be obtained.

In addition, in the configuration described above, it is preferable that the deceleration level control unit performs control such that the engagement degree of the clutch 130 is increased when the deceleration request is large, whereas the engagement degree of the clutch 130 is decreased when the deceleration request is small.

According to the configuration described above, when the engine 101 is restarted by the engagement of the clutch 130, the engagement degree of the clutch 130 is controlled corresponding to the magnitude of a requested deceleration level so that the deceleration level of the vehicle 100 at the time of the engagement can be precisely controlled, whereby lowering of the drivability can be prevented.

Fourth Embodiment

A fourth embodiment of the present invention will be described with reference to FIGS. 18 and 19.

Hereinafter, a problem to be solved by a vehicle control apparatus according to the present embodiment will be described with reference to FIG. 18. Note that FIG. 18 is an example of an oxygen storage amount in a catalyst in a case where a deceleration request is made and an engine 101 is started by an engagement of a clutch 130 with respect to the vehicle control apparatus according to the present invention.

Figure 18:
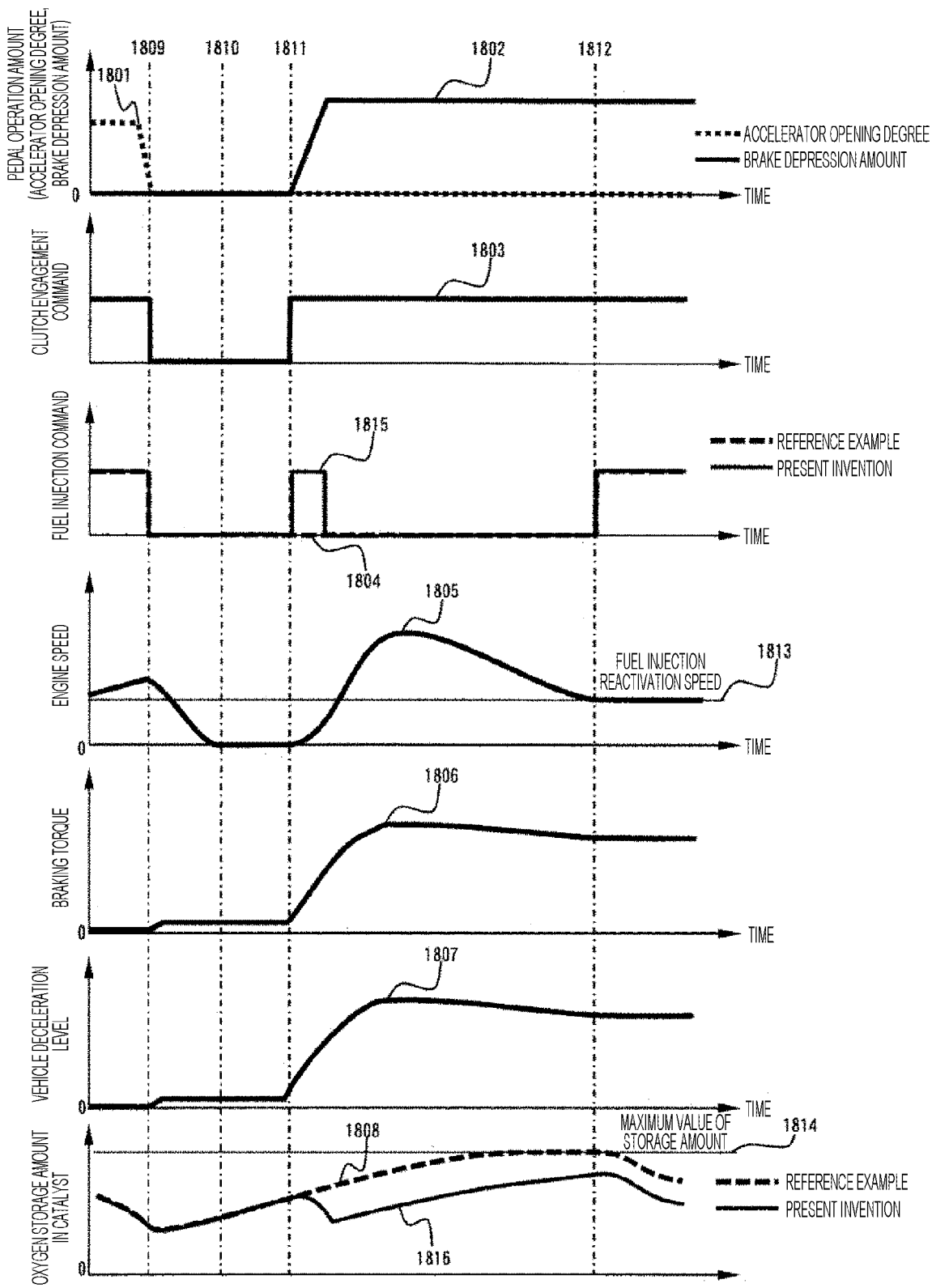
FIG. 18 is an example of an oxygen storage amount in a catalyst in the case where the deceleration request is made and the engine 101 is started by the engagement of the clutch 130 with respect to the vehicle control apparatus according to the present invention.
Figure 19:
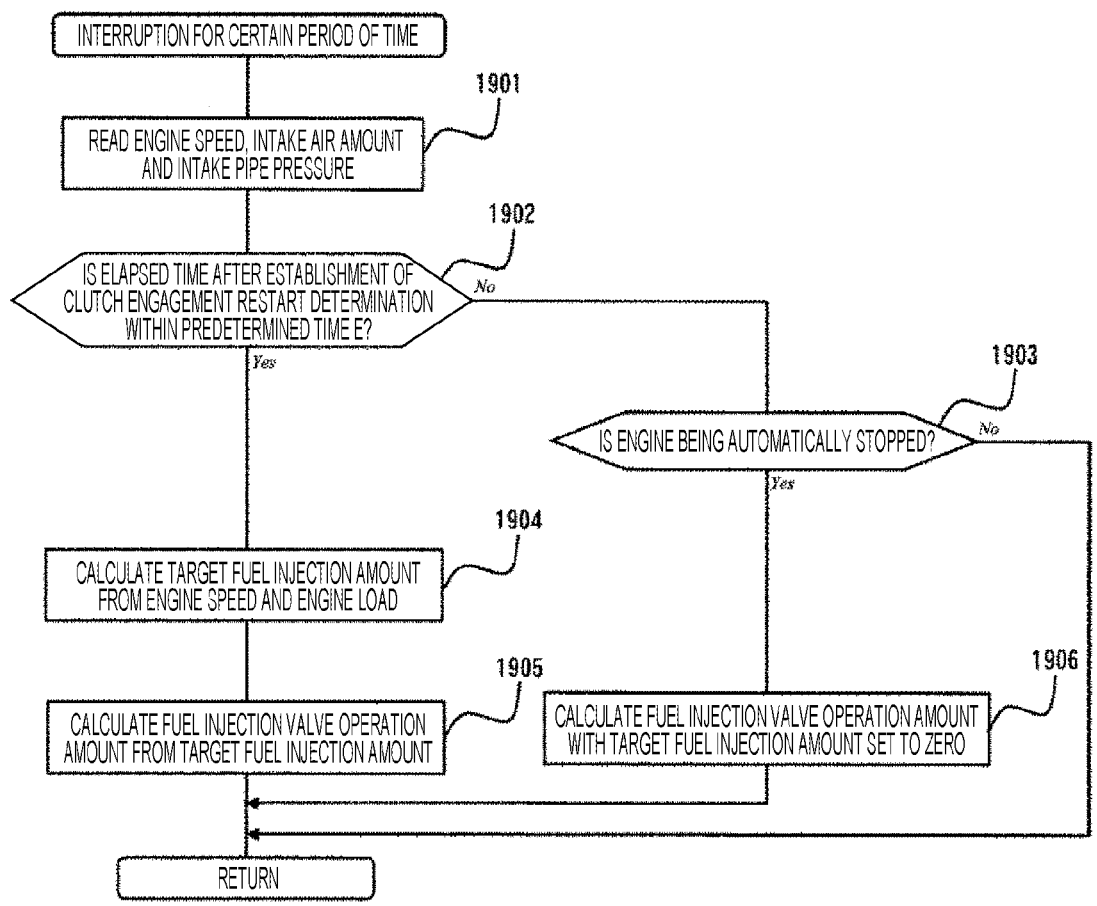
FIG. 19 is an exemplary flowchart of a block 408 of the vehicle control apparatus according to the present invention.

In FIG. 18, a line 1801 represents an accelerator opening degree, a line 1802 represents a brake depression amount, a line 1803 represents a clutch engagement command, a line 1804 represents a fuel injection command, a line 1805 represents engine speed, a line 1806 represents a braking torque, a line 1807 represents a vehicle deceleration level, and a line 1808 represents the oxygen storage amount in a catalyst. At a time point 1809 during traveling of a vehicle, an engine automatic stop condition is satisfied on the basis of an accelerator off state where the accelerator opening degree 1801 is zero. At this time, the clutch 130 is disengaged by the clutch engagement command 1803 turned off, and a fuel injection is stopped by the fuel injection command 1804 turned off. Accordingly, the engine 101 becomes a state where rotation cannot be maintained autonomously, whereby the engine speed 1805 becomes zero at a time point 1810 and the engine is stopped. At this time, the vehicle 100 coasts and the vehicle deceleration level 1807 is generated only by running resistance. Then, at a time point 1811 during coasting, when operation of a driver causes the brake depression amount 1802 to exceed zero, that is, when the driver depresses a brake pedal 117, there may be a case where the driver intends to express, in addition to the deceleration request, a request for stopping coasting, that is, a request for shifting into a state where the clutch 130 is engaged by restarting the engine 101. At this time, the engine 101 is cranked by activation of a starter 104, and the fuel injection is restarted by the fuel injection command 1804 turned on, whereby the engine 101 can be restarted. Meanwhile, since the clutch 130 is disengaged at the time point 1809 and thereafter, at the time point 1811, the clutch 130 is engaged by the clutch engagement command 1803 turned on without activating the starter 104, and kinetic energy of the coasting vehicle 100 is transmitted to the engine 101, whereby the engine 101 can be restarted. However, in this case, since the fuel injection command 1804 remains in an off state, the fuel injection remains in a stopped state until, after the engine is restarted, a time point 1812 at which the engine speed 1805 reaches a fuel injection reactivation speed 1813. Along with this, since the oxygen storage amount in a catalyst 1808 reaches a maximum storage value 1814, the oxygen amount in the catalyst becomes excessive and reduction reaction in the catalyst is not caused at the time point 1812 where the fuel injection is restarted, thereby worsening exhaust emission. In view of the above, it is an object of the present embodiment to provide a vehicle control apparatus that starts fuel injection to the engine 101 when the engine 101 is started by an engagement of the clutch 130.

Characteristics of the above-described present embodiment will be described with reference to FIG. 19. FIG. 19 is an exemplary flowchart of a block 409 in FIG. 4 with respect to the vehicle control apparatus as an object of the present invention. In Step 1901, the engine speed, an intake air amount, and intake pipe pressure are read. In Step 1902, it is determined whether an elapsed time after establishment of a clutch engagement restart is within a predetermined time E. When the determination is established, the process proceeds to Step 1904 to be described later. Otherwise, the process proceeds to Step 1903 to be described later. The elapsed time is cleared when the clutch engagement restart is established. The predetermined value E is set to, for example, a value similar to that in Step 1302 described above. In Step 1903, it is determined whether the engine is being automatically stopped. When the determination is established, the process proceeds to Step 1906 to be described later. Otherwise, no specific processing is performed and the process of the present flowchart is terminated. In Step 1904, a target fuel injection amount is calculated from the engine speed and an engine load. The target fuel injection amount may be a value acquired by searching a preset map with axes representing the engine speed and the engine load. Here, the engine load may be represented by intake pipe pressure converted by predetermined processing from an output of an intake pipe pressure sensor provided in an intake pipe, or an intake air amount measured by an intake air amount sensor such as a thermal air flow meter. In step 1905, an operation amount of a fuel injection valve is calculated from the target fuel injection amount, and a fuel injection amount of the engine is controlled on the basis of this operation amount. In step 1906, the operation amount of the fuel injection valve is calculated with the target fuel injection amount set to zero, and the fuel injection amount of the engine is controlled on the basis of this operation amount.

As illustrated in the drawings mentioned above, the vehicle control apparatus according to the present embodiment includes a deceleration level control unit 407 that controls the deceleration level of the vehicle 100 such that, during travelling of the vehicle 100 continuing to travel with the clutch 130 between the engine 101 and wheels 119L and 119R being disengaged, when the deceleration request is made and the engine 101 is started by the engagement of the clutch 130, the deceleration level becomes the target deceleration level calculated from a first target deceleration level generated after the engagement of the clutch 130 is complete and a second target deceleration level generated in response to the deceleration request. When a restart request is generated by an operation of the brake pedal 117, a CPU (control unit) 201 included in the vehicle control apparatus (ECU 110) controls an injector such that the fuel injection to the engine 101 is started.

According to the configuration described above, at the time point 1811 in FIG. 18, when the restart request is generated by the operation of the brake pedal 117, the fuel injection to the engine 101 is started by a fuel injection command 1815 turned on and is stopped after a predetermined time, whereby the oxygen storage amount in the catalyst is reduced from the oxygen storage amount in a catalyst 1808 to an oxygen storage amount in a catalyst 1816. As a result, deterioration of catalyst performance can be prevented. Accordingly, at the time point 1812 where the engine speed 1805 reaches the fuel injection reactivation speed 1813, when the fuel injection is started by the fuel injection command 1815 turned on, the reduction reaction in the catalyst is performed, thereby preventing deterioration of the exhaust emission.

The embodiments of the present invention have been described above. By combining the configuration described in a certain embodiment with the configuration of another embodiment, the actions and effects of each embodiment can be exerted.

REFERENCE SIGNS LIST 100 vehicle
101 engine
103 transmission
104 starter
105 generator
109 crank angle sensor
110 engine control unit (ECU)
111 intake manifold
112 throttle valve
113 air flow sensor
115 accelerator pedal
116 accelerator pedal sensor
117 brake pedal
118 brake pedal sensor
119L and 119R wheel
120 vehicle speed sensor
121 fuel injection valve
124 transmission control unit (TCU)
126 gear range information
130 clutch mechanism
132L and 132R brake pad
136 hydraulic unit (HU)
203 crank angle sensor
204 intake air amount sensor
205 intake pipe pressure sensor
206 vehicle speed sensor
207 accelerator pedal sensor
208 brake pedal sensor
209 ignition switch
401 engine automatic stop determination unit
403 engine restart request determination unit 404 clutch engagement restart request determination unit
405 target deceleration level calculation unit
406 vehicle deceleration level calculation unit
407 deceleration level control unit
408 fuel injection amount control unit

The invention claimed is:

1. A vehicle control apparatus, comprising:
a deceleration level control unit that controls a deceleration level of a vehicle, wherein
during travelling of the vehicle continuing to travel with a power transmission mechanism between an engine and wheels being disengaged, when a deceleration request is made and the engine is started by an engagement of the power transmission mechanism, the deceleration level of the vehicle is controlled such that the deceleration level becomes a target deceleration level calculated from a first target deceleration level generated after the engagement of the power transmission mechanism is complete and a second target deceleration level generated in response to the deceleration request.

2. The vehicle control apparatus according to claim 1, wherein
the deceleration request is generated by a driver's operation of a brake pedal.

3. The vehicle control apparatus according to claim 1, wherein
the engine includes a generator that generates electric power corresponding to rotation of the engine, and
the deceleration level control unit modifies the first target deceleration level on the basis of a power generation amount of the generator, and controls the deceleration level of the vehicle such that the deceleration level becomes the target deceleration level calculated from the modified first target deceleration level and the second deceleration level.

4. The vehicle control apparatus according to claim 1, wherein
the deceleration level control unit controls the deceleration level of the vehicle such that the deceleration level becomes the target deceleration level calculated from the first target deceleration level and the second target deceleration level by controlling a braking amount of brake devices for the wheels.

5. The vehicle control apparatus according to claim 1, wherein
the deceleration level control unit controls the deceleration level of the vehicle such that the deceleration level becomes the target deceleration level calculated from the first target deceleration level and the second target deceleration level by controlling hydraulic pressure generated by an operation of a brake pedal or hydraulic pressure by which a brake pad is operated.

6. The vehicle control apparatus according to claim 1, wherein
the deceleration level control unit controls the deceleration level of the vehicle such that the deceleration level becomes the target deceleration level calculated from the first target deceleration level and the second target deceleration level by controlling a transmission gear ratio of a transmission coupled to the engine.

7. The vehicle control apparatus according to claim 1, wherein
the deceleration level control unit controls the deceleration level of the vehicle such that the deceleration level becomes the target deceleration level calculated from the first target deceleration level and the second target deceleration level by controlling an engagement degree of the power transmission mechanism.

8. The vehicle control apparatus according to claim 1, wherein
the deceleration level control unit controls the deceleration level of the vehicle such that the deceleration level becomes the target deceleration level calculated from the first target deceleration level and the second target deceleration level by controlling an engagement degree of the power transmission mechanism such that the engagement degree of the power transmission mechanism is increased when the deceleration request is large, whereas the engagement degree of the power transmission mechanism is decreased when the deceleration request is small.

9. The vehicle control apparatus according to claim 1, wherein
fuel injection to the engine is started when a restart request is generated by an operation of the brake pedal.

* * * * *